(12) United States Patent
Balakrishnan et al.

(10) Patent No.: US 10,772,056 B2
(45) Date of Patent: Sep. 8, 2020

(54) WAKEUP RADIO (WUR) PACKET PREAMBLE DESIGN

(71) Applicant: Marvell World Trade Ltd., St. Michael (BB)

(72) Inventors: Hari Balakrishnan, Chennai (IN); Sri Varsha Rottela, Andhra Pradesh (IN); Rui Cao, Fremont, CA (US); Hongyuan Zhang, Fremont, CA (US); Sudhir Srinivasa, Campbell, CA (US); Hua Mu, San Jose, CA (US); Xiayu Zheng, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 105 days.

(21) Appl. No.: 16/049,732

(22) Filed: Jul. 30, 2018

(65) Prior Publication Data

US 2019/0306811 A1    Oct. 3, 2019

Related U.S. Application Data

(60) Provisional application No. 62/652,146, filed on Apr. 3, 2018.

(51) Int. Cl.
*H04W 56/00* (2009.01)
*H04W 72/04* (2009.01)
(Continued)

(52) U.S. Cl.
CPC ......... *H04W 56/001* (2013.01); *H04L 27/12* (2013.01); *H04W 52/028* (2013.01);
(Continued)

(58) Field of Classification Search
None
See application file for complete search history.

(56) References Cited

U.S. PATENT DOCUMENTS 8,331,419 B2    12/2012    Zhang et al.
8,332,732 B2    12/2012    Lakkis
(Continued)

FOREIGN PATENT DOCUMENTS

CN    107800526 A    3/2018
WO    WO-2009/059229    5/2009
WO    WO-2018/032774 A1    2/2018

OTHER PUBLICATIONS

International Search Report and Written Opinion in International Application No. PCT/US2018/04399, dated Dec. 19, 2018 (12 pages).

(Continued)

*Primary Examiner* — Ayaz R Sheikh
*Assistant Examiner* — Tarell A Hampton

(57) ABSTRACT

A first communication device generates a first portion and a second portion of a wakeup radio (WUR) wakeup packet. The first portion of the WUR wakeup packet corresponds to a wireless local area network (WLAN) legacy preamble, and spans a first frequency bandwidth. The second portion of the WUR wakeup packet spans a second bandwidth that is less than the first bandwidth, and is configured to cause a WUR of a second communication device to cause a WLAN network interface device of the second communication device to transition from a low power state to the active state. Generating the second portion of the WUR wakeup packet includes i) generating a sync portion having a plurality of sync symbols, and ii) generating a wakeup packet body. The first communication device transmits the WUR wakeup packet.

12 Claims, 11 Drawing Sheets

(51) Int. Cl.
  *H04W 52/02* (2009.01)
  *H04L 27/12* (2006.01)
  *H04W 84/12* (2009.01)
(52) U.S. Cl.
  CPC ... *H04W 52/0229* (2013.01); *H04W 52/0261* (2013.01); *H04W 72/0453* (2013.01); *H04W 84/12* (2013.01)

(56) References Cited

U.S. PATENT DOCUMENTS

| | | | |
|---|---|---|---|
| 8,527,853 | B2 | 9/2013 | Lakkis |
| 9,801,133 | B2 | 10/2017 | Min et al. |
| 9,826,483 | B2 | 11/2017 | Park et al. |
| 10,015,745 | B2 | 7/2018 | Azizi et al. |
| 10,129,064 | B1 | 11/2018 | Lee et al. |
| 2006/0067444 | A1* | 3/2006 | Hamamoto ........... H04L 1/0054 375/347 |
| 2010/0166113 | A1* | 7/2010 | Farley ............... H04W 52/0235 375/316 |
| 2014/0112225 | A1 | 4/2014 | Jafarian et al. |
| 2015/0208349 | A1 | 7/2015 | Ramamurthy et al. |
| 2016/0366644 | A1 | 12/2016 | Ghosh et al. |
| 2016/0374020 | A1 | 12/2016 | Azizi et al. |
| 2017/0094600 | A1 | 3/2017 | Min et al. |
| 2017/0111858 | A1 | 4/2017 | Azizi et al. |
| 2018/0019902 | A1 | 1/2018 | Suh et al. |
| 2018/0020405 | A1 | 1/2018 | Huang et al. |
| 2018/0020409 | A1 | 1/2018 | Aboul-Magd et al. |
| 2018/0132176 | A1 | 5/2018 | Abraham et al. |
| 2018/0184378 | A1 | 6/2018 | Fang et al. |
| 2018/0184379 | A1 | 6/2018 | Liu et al. |
| 2018/0206192 | A1 | 7/2018 | Vermani et al. |
| 2018/0255514 | A1 | 9/2018 | Sun et al. |
| 2018/0324717 | A1 | 11/2018 | Zhou et al. |
| 2018/0376370 | A1* | 12/2018 | Shellhammer ...... H04W 28/065 |
| 2019/0082385 | A1* | 3/2019 | Shellhammer ........ H04L 5/0091 |
| 2019/0124596 | A1 | 4/2019 | Cao et al. |

OTHER PUBLICATIONS

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

U.S. Appl. No. 15/985,480, Cao et al., "Wakeup Radio (WUR) Preamble Design," filed May 21, 2018.

U.S. Appl. No. 16/030,264, Ma et al., "Wakeup Packet Modulation and Demodulation," filed Jul. 9, 2018.

U.S. Appl. No. 16/155,701, Cao et al., "Wakeup Radio (WUR) Packet Multi-Format Design," filed Oct. 9, 2018.

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).

Park et al., "Proposal for Wake-Up Receiver (WUR) Study Group," IEEE Draft 802.11-16/0722r1, 14 pages (May 18, 2016).

U.S. Appl. No. 62/511,516, Cao et al., "Wake-Up Radio (WUR) Preamble Design," filed on May 26, 2017.

* cited by examiner

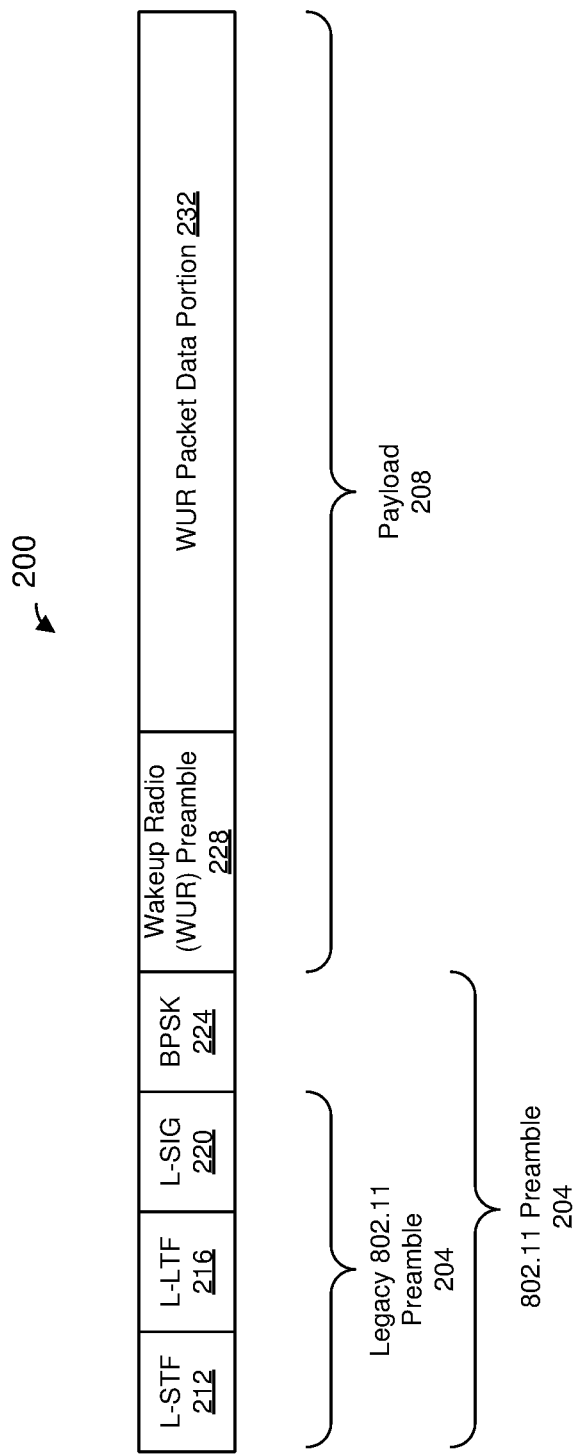

WAKEUP RADIO (WUR) PACKET PREAMBLE DESIGN

CROSS REFERENCES TO RELATED APPLICATIONS

This application claims the benefit of U.S. Provisional Patent Application No. 62/652,146, entitled "Wake-up Radio (WUR) Preamble Format Design," filed on Apr. 3, 2018, the disclosure of which is hereby expressly incorporated herein by reference in its entirety.

FIELD OF TECHNOLOGY

The present disclosure relates generally to wireless communication systems, and more particularly to formats of packets for communication systems employing wakeup radios (WURs).

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some WLANs include low cost wireless devices, such as wireless sensors, that do not require high data rates. To reduce operating costs, it may be useful for such wireless devices to be battery operated or otherwise power constrained. Power saving techniques for reducing power consumption are used with such power-constrained wireless devices. For example, a WLAN network interface of a power-constrained wireless device is put into to a low power state (e.g., a sleep state) for periods of time in order to decrease power consumption of the wireless device. When the wireless device is ready to transmit data to an access point, the WLAN network interface is transitioned to an active state so that the data can be transmitted. After the WLAN network interface transmits the data, the WLAN network interface transitions back to the low power state.

A WLAN network interface of a power-constrained wireless device may "wake up" periodically to listen for transmissions from the access point to determine whether the access point has data to transmit to the wireless device. However, such periodic "wake ups" by the WLAN network interface consume power even when the access point has no data to transmit to the wireless device. Therefore, to further reduce power consumption, some wireless devices employ a low power wakeup radio (LP-WUR) that consumes much less power as compared to the WLAN network interface. For example, the LP-WUR does not include any transmitter circuitry and may be capable of only receiving very low data rate transmissions. When the access point is ready to transmit data to the wireless device, the access point transmits a wakeup radio (WUR) wakeup packet (referred to herein simply as a "wakeup packet") addressed to the wireless device. In response to receiving the wakeup packet and determining that the wakeup packet is addressed to the wireless device, the LP-WUR wakes up the WLAN network interface so that the WLAN network interface is ready to receive data from the access point.

SUMMARY

In an embodiment, a method is performed by a first communication device and is for transmitting a wakeup packet configured to cause a wakeup radio of a second communication device to cause a wireless local area network (WLAN) network interface device of the second communication device to transition from a low power state to an active state. The method includes: generating, at the first communication device, a first portion of the wakeup packet, wherein the first portion of the wakeup packet corresponds to a WLAN legacy preamble of the wakeup packet, and wherein the first portion spans a first frequency bandwidth; generating, at the first communication device, a second portion of the wakeup packet, wherein the second portion of the wakeup packet spans a second bandwidth that is less than the first bandwidth, and wherein: the second portion of the wakeup packet is configured to cause the wakeup radio of the second communication device to cause the WLAN network interface device of the second communication device to transition from the low power state to the active state, generating the second portion of the wakeup packet includes i) generating a sync portion having a plurality of sync symbols, and ii) generating a wakeup packet body. The method also includes transmitting, by the first communication device, the wakeup packet.

In another embodiment, an apparatus comprises: a network interface device associated with a first communication device, wherein the network interface device comprises one or more integrated circuit (IC) devices. The one or more IC devices are configured to: generate a wireless local area network (WLAN) legacy preamble of a wakeup packet, wherein the wakeup packet is configured to cause a wakeup radio of a second communication device to cause a WLAN network interface device of the second communication device to transition from a low power state to an active state. The one or more IC devices are also configured to: generate a first portion of a wakeup packet, wherein the first portion of the wakeup packet corresponds to a wireless local area network (WLAN) legacy preamble of the wakeup packet, and wherein the first portion spans a first frequency bandwidth. The one or more IC devices are further configured to: generate a second portion of the wakeup packet, wherein the second portion of the wakeup packet spans a second bandwidth that is less than the first bandwidth, and wherein: the second portion of the wakeup packet is configured to cause a wakeup radio of a second communication device to cause a WLAN network interface device of the second communication device to transition from a low power state to an active state, and generating the second portion of the wakeup packet includes i) generating a sync portion having a plurality of sync symbols, and ii) generating a wakeup packet body. Additionally, the one or more IC devices are further configured to transmit the wakeup packet.

In yet another embodiment, a method is performed by a wakeup radio (WUR) of a communication device and is for processing a wakeup packet configured to cause the WUR of the communication device to cause a wireless local area network (WLAN) network interface device of the communication device to transition from a low power state to an active state. The wakeup packet includes i) a first portion having a WLAN legacy preamble that spans a first frequency bandwidth, and ii) a second portion that follows in time the first portion and that spans a second bandwidth narrower than the first bandwidth. The second portion includes i) a sync portion having a plurality of sync symbols, and ii) a wakeup packet body. The method includes: calculating, at the WUR, one or more correlations corresponding to one or more sync symbols included in the sync portion; detecting, at the WUR, the sync portion of the wakeup packet using the one or more correlations; determining, at the WUR, a symbol timing using the one or more correlations; and processing, at the WUR, the wakeup packet body based on the determined symbol timing.

In still another embodiment, an apparatus comprises: a wakeup radio WUR associated with a wireless local area network (WLAN) network interface device. The WUR comprises one or more integrated circuit (IC) devices configured to: process a wakeup packet. The wakeup packet includes i) a first portion having a WLAN legacy preamble that spans a first frequency bandwidth, and ii) a second portion that follows in time the first portion and that spans a second bandwidth narrower than the first bandwidth. The second portion includes i) the sync portion having a plurality of sync symbols, and ii) a wakeup packet body. Processing the wakeup packet includes calculating one or more correlations corresponding to one or more sync symbols included in the sync portion, detecting the sync portion of the wakeup packet using the one or more correlations, determining a symbol timing using the one or more correlations, and processing the wakeup packet body based on the determined symbol timing.

BRIEF DESCRIPTION OF THE DRAWINGS

FIG. 2 is a diagram of a wakeup packet, according to an embodiment.

DETAILED DESCRIPTION

Techniques for generating and processing packets are described below in the context of low power wakeup radios merely for explanatory purposes. In other embodiments, packet generation and processing techniques are utilized in other types of wireless communication systems such as personal area networks (PANs), mobile communication networks such as cellular networks, metropolitan area networks (MANs), satellite communication networks, etc., that use a narrower bandwidth than WLANs.

Figure 1A:
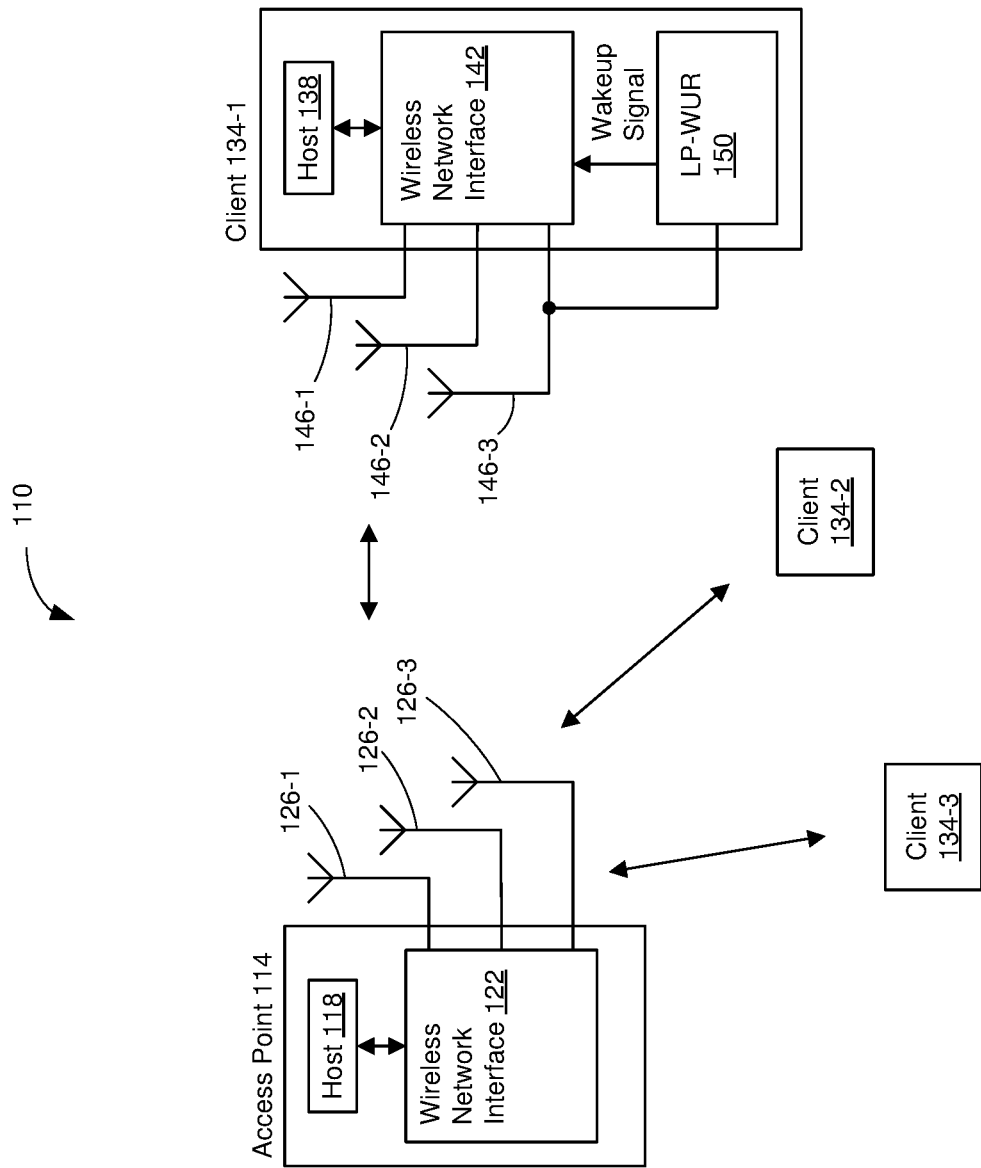
FIG. 1A is a block diagram of an example wireless local area network (WLAN) having a client station with a low power wakeup radio (LP-WUR), according to an embodiment.

FIG. 1A is a block diagram of an example WLAN 110, according to an embodiment. The WLAN 110 includes an access point (AP) 114 that comprises a host processor 118 coupled to a wireless network interface device 122. The wireless network interface device 122 is coupled to a plurality of antennas 126. Although three antennas 126 are illustrated in FIG. 1A, the AP 114 includes other suitable numbers (e.g., 1, 2, 4, 5, etc.) of antennas 126 in other embodiments. As will be described in more detail below, the wireless network interface device 122 is configured to generate and transmit a wakeup packet that can be decoded by low power wakeup radios (LP-WURs) in the WLAN 110.

The host processor 118 is configured to executed machine readable instructions stored in a memory device (not shown), according to an embodiment. The host processor 118 is implemented on an integrated circuit (IC), according to an embodiment. The wireless network interface device 122 is implemented on one or more ICs. The host processor 118 is implemented on one IC and the wireless network interface device 122 is implemented on one or more other, different ICs, according to an embodiment. The host processor 118 is implemented on a first IC and the wireless network interface device 122 is implemented on at least the same first IC and optionally on one or more second ICs, according to an embodiment.

The WLAN 110 also includes one or more client stations 134. Although three client stations 134 are illustrated in FIG. 1A, the WLAN 110 includes other suitable numbers (e.g., 1, 2, 4, 5, 6, etc.) of client stations 134 in various embodiments. The client station 134-1 includes a host processor 138 coupled to a wireless network interface device 142. The wireless network interface device 142 is coupled to one or more antennas 146. Although three antennas 146 are illustrated in FIG. 1A, the client station 134-1 includes other suitable numbers (e.g., 1, 2, 4, 5, etc.) of antennas 146 in other embodiments.

The wireless network interface device 142 is configured to go into a low power state in which the wireless network interface device 142 consumes significantly less power as compared to an active state of the wireless network interface device 142. The wireless network interface device 142 is capable of wirelessly receiving and transmitting via the one or more antennas 146 while in the active state. In an embodiment, the wireless network interface device 142 is incapable of wirelessly receiving and transmitting via the one or more antennas 146 while in the low power state.

The client station 134-1 also includes a LP-WUR 150 coupled to the wireless network interface device 142 and to at least one of the antennas 146. The LP-WUR 150 is configured to use very low power (e.g., less than 100 microwatts or another suitable amount of power). The LP-WUR 150 is configured to use significantly less power (e.g., less than 20%, less than 10%, less than 5%, less than 2%, less than 1%, etc) than the wireless network interface device 142 while the wireless network interface device 142 is in the active state, according to an embodiment.

The LP-WUR 150 is configured to receive and decode wakeup packets transmitted by the AP 114 and received via one or more of the antennas 146. The LP-WUR 150 is configured to determine whether a received wakeup packet includes an address (e.g., a media access control (MAC) address, an association identifier (AID), or another suitable network address) corresponding to the client station 134-1, according to an embodiment. The LP-WUR 150 is configured to generate a wakeup signal in response to determining that a received wakeup packet includes the address corresponding to the client station 134-1. An address corresponding to the client station 134-1 includes one or more of i) a unicast address corresponding to the client station 134-1, ii) a multicast address corresponding to a group of client stations that includes the client station 134-1, and/or iii) a broadcast address that corresponds to all client stations, in various embodiments.

When the wireless network interface device 142 is in the low power state and receives the wakeup signal from the LP-WUR 150, the wireless network interface device 142 is configured to transition to the active power state in response to the wakeup signal, according to an embodiment. For example, when the wireless network interface device 142 is in the low power state and receives the wakeup signal from the LP-WUR 150, the wireless network interface device 142 responsively transitions to the active power state to become ready to transmit and/or receive, according to an embodiment.

The host processor 138 is configured to executed machine readable instructions stored in a memory device (not shown), according to an embodiment. The host processor 138 is implemented on an IC, according to an embodiment. The wireless network interface device 142 is implemented on one or more ICs. The host processor 138 is implemented on one IC and the wireless network interface device 142 is implemented on one or more other, different ICs, according to an embodiment. The host processor 138 is implemented on a first IC and the wireless network interface device 142 is implemented on at least the same first IC and optionally on one or more second ICs, according to an embodiment.

The LP-WUR 150 is implemented on one IC and the wireless network interface device 142 is implemented on one or more other, different ICs, according to an embodiment. The LP-WUR 150 is implemented on a first IC and the wireless network interface device 142 is implemented on at least the same first IC and optionally on one or more second ICs, according to an embodiment.

In an embodiment, each of the client stations 134-2 and 134-3 has a structure that is the same as or similar to the client station 134-1. For example, one or both of the client stations 134-2 and 134-3 includes a respective LP-WUR, according to an embodiment. As another example, one or both of the client stations 134-2 and 134-3 does not include a LP-WUR, according to another embodiment. Each of the client stations 134-2 and 134-3 has the same or a different number of antennas (e.g., 1, 2, 3, 4, 5, etc.). For example, the client station 134-2 and/or the client station 134-3 each have only two antennas (not shown), according to an embodiment.

Figure 1C:
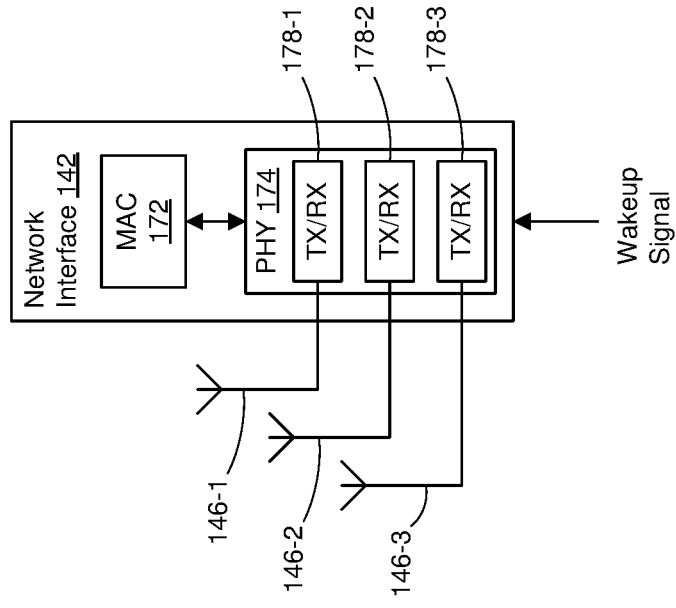
FIG. 1C is a block diagram of an example wireless network interface device of the client station included in the WLAN of FIG. 1A, according to an embodiment.
Figure 1B:
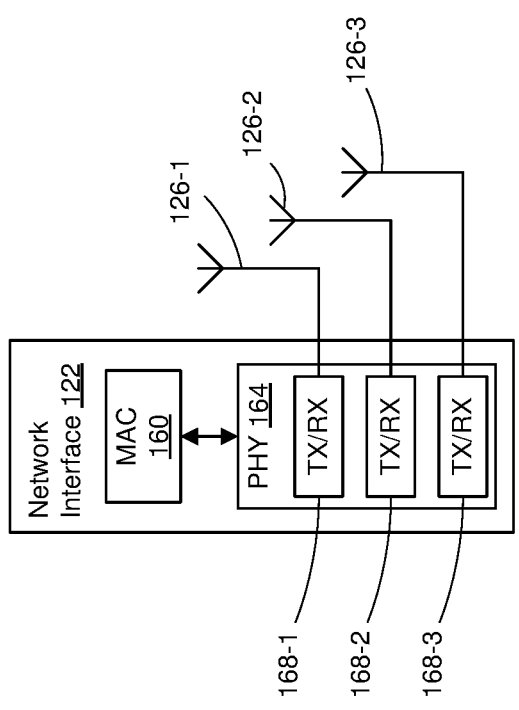
FIG. 1B is a block diagram of an example wireless network interface device of an access point included in the WLAN of FIG. 1A, according to an embodiment.

FIG. 1B is a block diagram of the network interface device 122 of the AP 114 of FIG. 1A, according to an embodiment. The network interface 122 includes a MAC layer processor 160 coupled to a physical layer (PHY) processor 164. The PHY processor 164 includes a plurality of transceivers 168 coupled to the plurality of antennas 126. Although three transceivers 168 and three antennas 126 are illustrated in FIG. 1B, the PHY processor 164 includes other suitable numbers (e.g., 1, 2, 4, 5, etc.) of transceivers 168 coupled to other suitable numbers of antennas 126 in other embodiments. In some embodiments, the AP 114 includes a higher number of antennas 126 than transceivers 168, and the PHY processor 164 is configured to use antenna switching techniques.

The network interface 122 is implemented using one or more ICs configured to operate as discussed below. For example, the MAC layer processor 160 may be implemented, at least partially, on a first IC, and the PHY processor 164 may be implemented, at least partially, on a second IC. As another example, at least a portion of the MAC layer processor 160 and at least a portion of the PHY processor 164 may be implemented on a single IC. For instance, the network interface 122 may be implemented using a system on a chip (SoC), where the SoC includes at least a portion of the MAC layer processor 160 and at least a portion of the PHY processor 164.

In various embodiments, the MAC layer processor 160 and/or the PHY processor 164 of the AP 114 are configured to generate data units, and process received data units, that conform to a WLAN communication protocol such as a communication protocol conforming to the IEEE 802.11 Standard or another suitable wireless communication protocol. For example, the MAC layer processor 160 may be configured to implement MAC layer functions, including MAC layer functions of the WLAN communication protocol, and the PHY processor 164 may be configured to implement PHY functions, including PHY functions of the WLAN communication protocol. For instance, the MAC layer processor 160 may be configured to generate MAC layer data units such as MAC service data units (MSDUs), MAC protocol data units (MPDUs), etc., and provide the MAC layer data units to the PHY processor 164. The PHY processor 164 may be configured to receive MAC layer data units from the MAC layer processor 160 and encapsulate the MAC layer data units to generate PHY data units such as PHY protocol data units (PPDUs) for transmission via the antennas 126. Similarly, the PHY processor 164 may be configured to receive PHY data units that were received via the antennas 126, and extract MAC layer data units encapsulated within the PHY data units. The PHY processor 164 may provide the extracted MAC layer data units to the MAC layer processor 160, which then processes the MAC layer data units.

In connection with generating one or more radio frequency (RF) signals for transmission, the PHY processor 164 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 164 is configured to upconvert the one or more analog baseband signals to one or more RF signals for transmission via the one or more antennas 138.

In connection with receiving one or more RF signals, the PHY processor 164 is configured to downconvert the one or more RF signals to one or more analog baseband signals, and to convert the one or more analog baseband signals to one or more digital baseband signals. The PHY processor 164 is further configured to process (which may include demodulating, filtering, etc.) the one or more digital baseband signals to generate a PPDU.

The PHY processor 164 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 164 is configured to generate one or more RF signals that are provided to the one or more antennas 126. The PHY processor 164 is also configured to receive one or more RF signals from the one or more antennas 126.

The MAC processor 160 is configured to control the PHY processor 164 to generate one or more RF signals by, for example, providing one or more MAC layer data units (e.g., MPDUs) to the PHY processor 164, and optionally providing one or more control signals to the PHY processor 164, according to some embodiments. In an embodiment, the MAC processor 160 includes a processor configured to execute machine readable instructions stored in a memory device (not shown) such as a RAM, a read ROM, a flash memory, etc. In an embodiment, the MAC processor 160 includes a hardware state machine.

FIG. 1C is a block diagram of the network interface device 142 of the client station 134-1 of FIG. 1A, according to an embodiment. The network interface 142 includes a MAC layer processor 172 coupled to a PHY processor 174. The PHY processor 174 includes a plurality of transceivers 178 coupled to the one or more antennas 146. Although three transceivers 178 and three antennas 126 are illustrated in FIG. 1C, the PHY processor 174 includes other suitable numbers (e.g., 1, 2, 4, 5, etc.) of transceivers 178 coupled to other suitable numbers of antennas 146 in other embodiments. In some embodiments, the client station 134-1 includes a higher number of antennas 146 than transceivers 178, and the PHY processor 174 is configured to use antenna switching techniques.

The network interface 142 is implemented using one or more ICs configured to operate as discussed below. For example, the MAC layer processor 172 may be implemented, at least partially, on a first IC, and the PHY processor 174 may be implemented, at least partially, on a second IC. As another example, at least a portion of the MAC layer processor 172 and at least a portion of the PHY processor 174 may be implemented on a single IC. For instance, the network interface 142 may be implemented using a system on a chip (SoC), where the SoC includes at least a portion of the MAC layer processor 172 and at least a portion of the PHY processor 174.

In various embodiments, the MAC layer processor 172 and the PHY processor 174 of the client device 134-1 are configured to generate data units, and process received data units, that conform to the WLAN communication protocol or another suitable communication protocol. For example, the MAC layer processor 172 may be configured to implement MAC layer functions, including MAC layer functions of the WLAN communication protocol, and the PHY processor 174 may be configured to implement PHY functions, including PHY functions of the WLAN communication protocol. The MAC layer processor 172 may be configured to generate MAC layer data units such as MSDUs, MPDUs, etc., and provide the MAC layer data units to the PHY processor 174. The PHY processor 174 may be configured to receive MAC layer data units from the MAC layer processor 172 and encapsulate the MAC layer data units to generate PHY data units such as PPDUs for transmission via the one or more antennas 146. Similarly, the PHY processor 174 may be configured to receive PHY data units that were received via the one or more antennas 146, and extract MAC layer data units encapsulated within the PHY data units. The PHY processor 174 may provide the extracted MAC layer data units to the MAC layer processor 172, which then processes the MAC layer data units.

As discussed above, the network interface device 142 is configured to transition between an active state and a low power state. When the wireless network interface device 142 is in the low power state and receives the wakeup signal from the LP-WUR 150, the wireless network interface device 142 is configured to transition to the active power state in response to the wakeup signal, according to an embodiment.

The PHY processor 174 is configured to downconvert one or more RF signals received via the one or more antennas 146 to one or more baseband analog signals, and convert the analog baseband signal(s) to one or more digital baseband signals, according to an embodiment. The PHY processor 174 is further configured to process the one or more digital baseband signals to demodulate the one or more digital baseband signals and to generate a PPDU. The PHY processor 174 includes amplifiers (e.g., an LNA, a power amplifier, etc.), an RF downconverter, an RF upconverter, a plurality of filters, one or ADCs, one or more DACs, one or more DFT calculators (e.g., a fast Fourier transform (FFT) calculator), one or more IDFT calculators (e.g., an inverse fast Fourier transform (IFFT) calculator), one or more modulators, one or more demodulators, etc.

The PHY processor 174 is configured to generate one or more RF signals that are provided to the one or more antennas 146. The PHY processor 174 is also configured to receive one or more RF signals from the one or more antennas 146.

The MAC processor 172 is configured to control the PHY processor 174 to generate one or more RF signals by, for example, providing one or more MAC layer data units (e.g., MPDUs) to the PHY processor 174, and optionally providing one or more control signals to the PHY processor 174, according to some embodiments. In an embodiment, the MAC processor 172 includes a processor configured to execute machine readable instructions stored in a memory device (not shown) such as a RAM, a read ROM, a flash memory, etc. In an embodiment, the MAC processor 172 includes a hardware state machine.

Figure 1D:
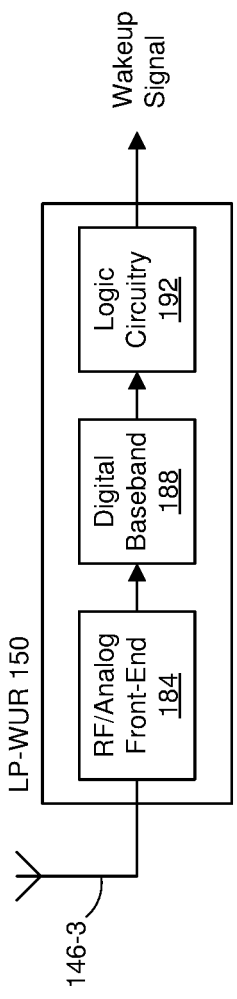
FIG. 1D is a block diagram of an example LP-WUR in the WLAN of FIG. 1A, according to an embodiment.

FIG. 1D is a block diagram of the LP-WUR 150 of the client station 134-1 of FIG. 1A, according to an embodiment. The LP-WUR 150 includes radio frequency (RF)/analog front-end circuitry 184 coupled to at least one of the antennas 146. The RF/analog front-end circuitry 184 includes one or more amplifiers (e.g., a low noise amplifier (LNA)), an RF downconverter, one or more filters, and one or more analog-to-digital converters (ADCs). In an embodiment, the RF/analog front-end circuitry 184 is configured to downconvert an RF signal to a baseband analog signal, and convert the analog baseband signal to a digital baseband signal.

The RF/analog front-end circuitry 184 is coupled to digital baseband circuitry 188. The digital baseband circuitry 188 is configured to process the digital baseband signal to determine whether the digital baseband signal corresponds to a wakeup packet. The digital baseband circuitry 188 includes a demodulator that demodulates data from the digital baseband signal to generate an information signal corresponding to information included in a wakeup packet.

The digital baseband circuitry 188 is coupled to logic circuitry 192. The logic circuitry 192 is configured to process the information signal to determine whether a wakeup packet includes an address (e.g., a MAC address, an AID, or another suitable network address) corresponding to the client station 134-1, according to an embodiment. The logic circuitry 192 is configured to generate the wakeup signal in response to determining that a received wakeup packet includes the address corresponding to the client station 134-1.

FIG. 2 is a block diagram of a wakeup packet 200 used in the example WLAN 110 of FIG. 1, according to an embodiment. The network interface 122 of the AP 114 is configured to generate and transmit the wakeup packet 200, according to an embodiment. The network interface 142 of the client station 134-1 is also configured to generate and transmit the wakeup packet 200, e.g., to prompt another client station 134 to wake up from a low power state, according to another embodiment.

The LP-WUR 150 of the client station 134-1 is configured to receive, detect, and decode the wakeup packet 200, according to an embodiment.

The wakeup packet 200 includes an 802.11 preamble portion 204 and a payload 208. The 802.11 preamble portion 204 enables IEEE 802.11 stations (e.g., wireless communication devices that are configured to operate according to the IEEE 802.11 Standard) to detect the wakeup packet 200 and determine a length of the wakeup packet 200 for the purpose of reducing transmissions by IEEE 802.11 stations that will collide with the wakeup packet 200, according to an embodiment.

The 802.11 preamble portion 204 includes a legacy 802.11 preamble 210, which corresponds to a legacy preamble defined by the IEEE 802.11 Standard, according to an embodiment. The legacy 802.11 preamble 210 includes a legacy short training field (L-STF) 212, a legacy long training field (L-LTF) 216, a legacy signal field (L-SIG) 220. The L-STF 212 includes signals designed for packet detection and automatic gain control (AGC) training. The L-LTF 216 includes signals designed for channel estimation and synchronization. The L-SIG 220 includes information regarding the wakeup packet 200, including length information (e.g., in a length subfield (not shown)) that can be used by IEEE 802.11 stations to determine when the wakeup packet 200 will end.

In other embodiments, the wakeup packet 200 includes a legacy preamble (different than the legacy 802.11 preamble 210) that enables stations that conform to a different suitable wireless communication protocol (e.g., other than the IEEE 802.11 Standard) to detect the wakeup packet 200 and determine a length of the wakeup packet 200 for the purpose of reducing transmissions by such stations that will collide with the wakeup packet 200, according to an embodiment.

In an embodiment, the 802.11 preamble portion 204 also includes a binary phase shift keying (BPSK) modulated field (BPSK-modulated field) 224 that follows the legacy 802.11 preamble 210. In an embodiment, the BPSK-modulated field 224 is a repetition of the L-SIG 220. In an embodiment, the BPSK-modulated field 224 is identical to at least a portion of the L-LTF 216. In other embodiments, the BPSK-modulated field 224 includes any other suitable signal and/or information. In an embodiment, the BPSK-modulated field 224 does not convey any useful information to recipient communication devices. In another embodiment, the BPSK-modulated field 224 does convey useful information to recipient communication devices. For example, in an embodiment, wakeup packet data (e.g., which includes a network address corresponding to an intended client station or stations) is encoded within/on a set of OFDM symbols that includes the BPSK-modulated field 224 and the payload 208. In some embodiments, the BPSK-modulated field 224 is omitted from the wakeup packet 200.

The payload 208 includes a wakeup preamble 228. In an embodiment, the wakeup preamble 228 includes signals that enable LP-WURs such as the LP-WUR 150 to detect the payload 208 of the wakeup packet 200 and to synchronize to the payload 208 of the wakeup packet 200. The payload 208 also includes a wakeup packet data portion 232. In an embodiment, the wakeup packet data portion 232 includes an address (e.g., a MAC address, an AID, or another suitable network address) corresponding to a client station (or client stations) to which the wakeup packet 200 is intended. Referring now to FIG. 1D, the digital baseband circuitry 188 is configured to detect the wakeup packet 200 at least by detecting the wakeup preamble 228, according to an embodiment. The logic circuitry 192 is configured to process the wakeup packet body 232 to determine whether the wakeup packet body 232 includes an address (e.g., a MAC address, an AID, or another suitable network address) corresponding to the client station 134-1.

In an embodiment, the legacy 802.11 preamble 210 spans a first frequency bandwidth, and the wakeup preamble 228 and the wakeup packet data portion 232 span a second frequency bandwidth that is narrower than the first frequency bandwidth. For example, the first frequency bandwidth is 20 MHz and the second frequency bandwidth is a narrower bandwidth such as approximately 4 MHz (e.g. 4.06 MHz), or another suitable narrower bandwidth such as 1 MHz, 2 MHz, 5 MHz, 10 MHz, etc.

Figure 3A:
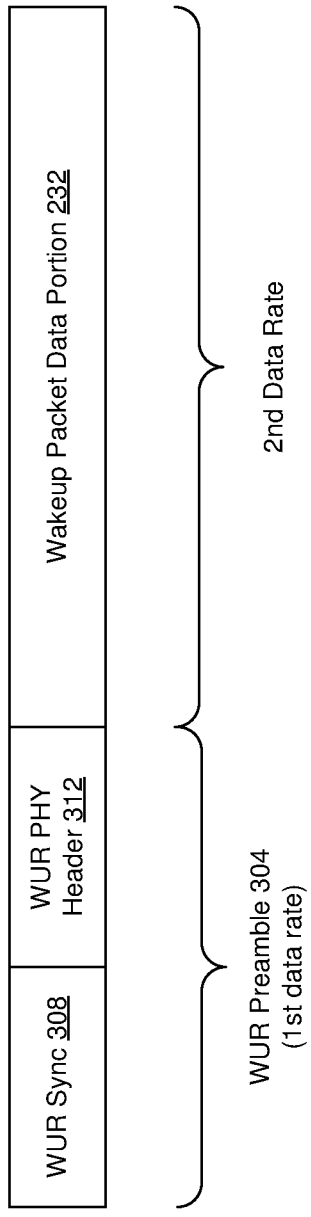
FIG. 3A is a diagram of an example payload of the wakeup packet of FIG. 2, according to an embodiment.

FIG. 3A is a diagram of an example payload portion 300 of a wakeup packet, such as the wakeup packet 200 of FIG. 2, according to an embodiment. The payload portion 300 is used as the payload 208 of the wakeup packet 200 of FIG. 2, according to an embodiment. FIG. 3A is described in the context of the wakeup packet 200 of FIG. 2 for explanatory purposes. In other embodiments, however, the payload portion 300 is included in another suitable wakeup packet different that the wakeup packet 200 of FIG. 2.

The payload portion 300 includes a WUR preamble 304 and the wakeup packet data portion 232 (FIG. 2). The WUR preamble 304 includes a WUR sync portion 308 and a WUR PHY header portion 312. The WUR sync portion 308 is used by a wakeup radio (e.g., the LP-WUR 150 of FIG. 1) for one or more of carrier sensing, detection of the payload portion 300, synchronization to the payload portion 300, etc. The WUR PHY header portion 312 includes information regarding the payload portion 300 that is used by a wakeup radio (e.g., the LP-WUR 150 of FIG. 1) to process the wakeup packet data portion 232 (FIG. 2). The information regarding the payload portion 300 in the WUR PHY header portion 312 includes PHY parameter signaling, such as one or more of a data rate at which the wakeup packet data portion 232 is encoded, a modulation schemed used for the wakeup packet data portion 232, a coding scheme used for the wakeup packet data portion 232, a length/duration of the wakeup packet data portion 232, etc.

In an embodiment, the WUR preamble 304 is modulated/encoded according to a first, lowest data rate defined by a communication protocol, whereas the wakeup packet data portion 232 is modulated/encoded according to a second data rate defined by the communication protocol, where the second data rate is selected from a plurality of data rates defined by the communication protocol, which includes one or more data rates that are higher than the first data rate. The WUR PHY header portion 312 includes information that indicates the second data rate, according to an embodiment.

Figure 3B:
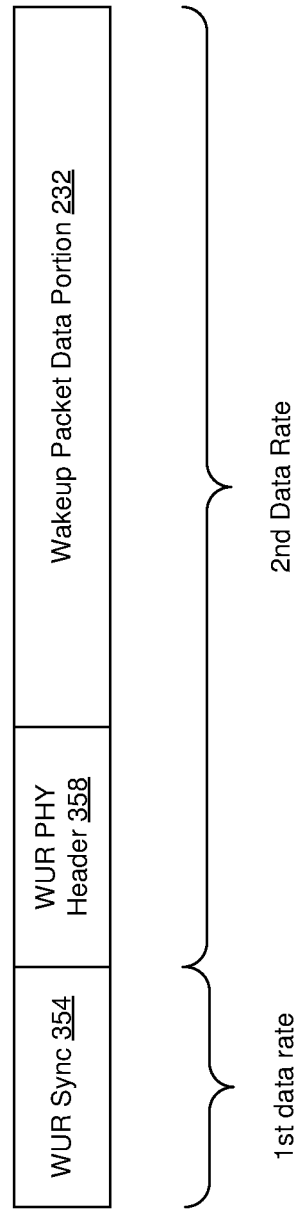
FIG. 3B is a diagram of another example payload of the wakeup packet of FIG. 2, according to another embodiment.

FIG. 3B is a diagram of another example payload portion 350 of a wakeup packet, such as the wakeup packet 200 of FIG. 2, according to another embodiment. The payload portion 350 is used as the payload 208 of the wakeup packet 200 of FIG. 2, according to an embodiment. FIG. 3B is described in the context of the wakeup packet 200 of FIG. 2 for explanatory purposes. In other embodiments, however, the payload portion 350 is included in another suitable wakeup packet different that the wakeup packet 200 of FIG. 2.

The payload portion 350 includes a WUR sync portion 354 and a WUR PHY header portion 358. The WUR sync portion 354 is used by a wakeup radio (e.g., the LP-WUR 150 of FIG. 1) for one or more of carrier sensing, detection of the payload portion 300, synchronization to the payload portion 300, etc. The WUR sync portion 354 also indicates one or more PHY parameters, such as one or more of a data rate at which the wakeup packet data portion 232 is encoded, a modulation schemed used for the wakeup packet data portion 232, a coding scheme used for the wakeup packet data portion 232, etc., and is used by a wakeup radio (e.g., the LP-WUR 150 of FIG. 1) to process the WUR PHY header portion 358 and/or the wakeup packet data portion 232 (FIG. 2). For example, the WUR sync portion 354 may include a sync pattern selected from a plurality of sync patterns, wherein sync patterns from among the plurality of sync patterns indicate one or more of respective data rates, respective modulation schemes, respective coding rates, etc.

The WUR PHY header portion 358 includes information regarding the payload portion 300 that is used by a wakeup radio (e.g., the LP-WUR 150 of FIG. 1) to process the wakeup packet data portion 232 (FIG. 2). The information regarding the payload portion 300 in the WUR PHY header portion 358 includes PHY parameter signaling, such as one or more of a data rate at which the wakeup packet data portion 232 is encoded, a modulation schemed used for the wakeup packet data portion 232, a coding scheme used for the wakeup packet data portion 232, a length/duration of the wakeup packet data portion 232, etc.

In an embodiment, the WUR sync portion 354 is modulated/encoded according to the first, lowest data rate defined by the communication protocol, whereas the WUR PHY header portion and the wakeup packet data portion 232 are modulated/encoded according to a second data rate defined by the communication protocol, where the second data rate is selected from a plurality of data rates defined by the communication protocol, which includes one or more data rates that are higher than the first data rate. The WUR sync portion 354 indicates the second data rate, according to an embodiment.

In some embodiments in which the WUR sync portion 354 indicates one or more PHY parameters, such as one or more of a data rate at which the wakeup packet data portion 232 is encoded, a modulation schemed used for the wakeup packet data portion 232, a coding scheme used for the wakeup packet data portion 232, etc., the WUR PHY header portion 358 is omitted from the payload portion 350.

Figure 4:
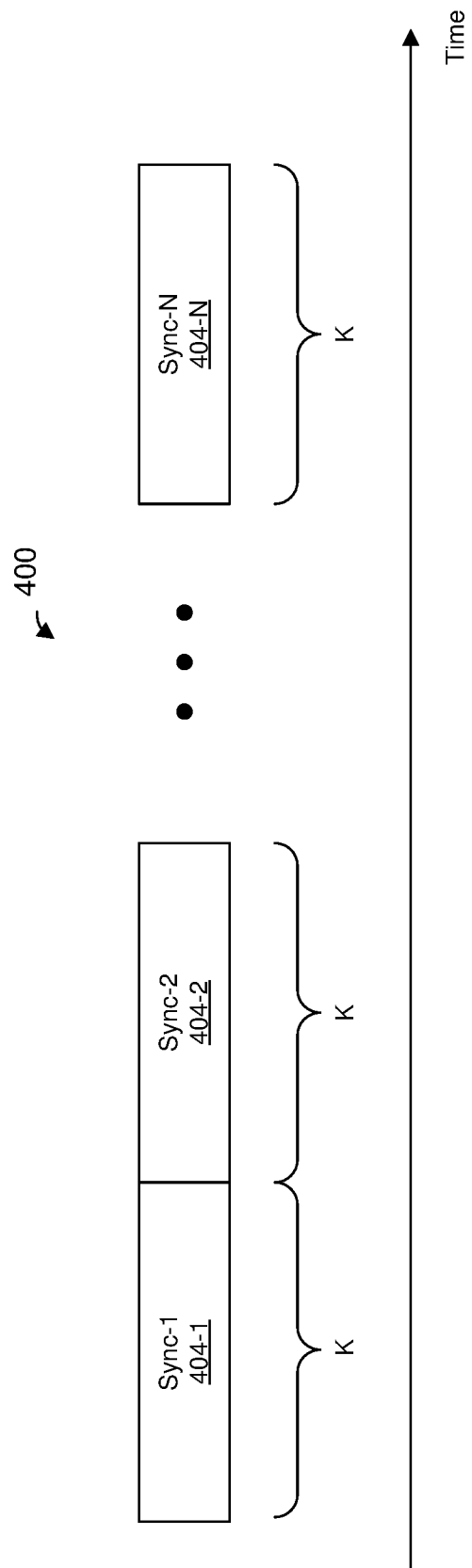
FIG. 4 is a diagram of an example wakeup radio (WUR) sync portion of a wakeup packet, according to another embodiment.

FIG. 4 is a diagram of an example WUR sync portion 400, according to an embodiment. The WUR sync portion 400 is used in a WUR packet such as those described above with reference to FIGS. 2, 3A, and 3B, or another suitable WUR packet, in various embodiments.

The WUR sync portion 400 includes N sync sequences 404, where N is a suitable integer greater than two. Each sync sequence 404 is sometimes referred to herein as a sync symbol 404.

Each sync sequence 404 has a length of K samples corresponding to a suitable sampling rate, wherein K is a suitable integer greater than two. Generally, as the value of N increases, a carrier sensing (CS) property of the sync sequence 404 improves and a symbol timing acquisition (ST) property of the sync sequence 404 improves, at least in some embodiments. Generally, as the value of K increases, a correlation property of the sync sequence 404 improves, at least in some embodiments. Generally, as N and K increase, the length of the WUR sync portion 400 increases, which adversely affects efficiency because more channel time is consumed transmitting the WUR sync portion 400 rather than user data, at least in some embodiments.

In some embodiments, the WUR sync portion 400 is modulated according to on-off keying (OOK). For example, in some embodiments, each sync sequence 404 is selected from a set consisting of two sync symbols: i) a predetermined sequence corresponding to "On" (O), and ii) a zero energy sequence (e.g., a sequence of zeros) corresponding to "Off" (F). Thus, as an illustrative example in which N is four, the WUR sync portion 400 comprises OOOF. As another illustrative example in which N is four, the WUR sync portion 400 comprises OFOF. As an illustrative example in which N is five, the WUR sync portion 400 comprises OOOOF. As another illustrative example in which N is five, the WUR sync portion 400 comprises OOFOF. As an illustrative example in which N is six, the WUR sync portion 400 comprises OOOOOF. As another illustrative example in which N is six, the WUR sync portion 400 comprises OFOFOF.

In other embodiments, each sync sequence 404 is selected from a set consisting of three sync symbols: i) a predetermined sequence corresponding to "On" (O), ii) a zero energy sequence (e.g., a sequence of zeros) corresponding to "Off" (F), and iii) the predetermined sequence phase rotated by 180 degrees corresponding to "Negative On" (M). Thus, as an illustrative example in which N is five, the WUR sync portion 400 comprises OOMOF. As another illustrative example in which N is five, the WUR sync portion 400 comprises OOMOM.

In some embodiments, the WUR sync portion 400 is modulated according to OOK combined with Manchester coding. For example, in some embodiments, each sync sequence 404 is selected from a set consisting of two sync symbols: i) a first sequence comprising a) a first occurring half (in time) set to a predetermined sequence, and b) a second occurring half (in time) set to a zero energy sequence (e.g., a sequence of zeros) "On" (O); and ii) a second sequence comprising a) a first occurring half (in time) set to a zero energy sequence (e.g., a sequence of zeros), and b) a second occurring half (in time) set to a predetermined sequence "Off" (F). Thus, as an illustrative example in which N is four, the WUR sync portion 400 comprises OOOF. As another illustrative example in which N is four, the WUR sync portion 400 comprises OFOF. As an illustrative example in which N is five, the WUR sync portion 400 comprises OOOOF. As another illustrative example in which N is five, the WUR sync portion 400 comprises OOFOF. As an illustrative example in which N is six, the WUR sync portion 400 comprises OOOOOF. As another illustrative example in which N is six, the WUR sync portion 400 comprises OFOFOF.

In some embodiments, each sync sequence 404 is selected from a set consisting of two sync symbols: i) a predetermined sequence (SYNC), and ii) the predetermined sequence phase rotated by 180 degrees (−SYNC), wherein the predetermined sequence (SYNC) comprises a plurality of modulated subsymbols. For instance, each subsymbol is modulated according to a suitable modulation scheme such as BPSK, quadrature phase shift keying (QPSK), etc., according to various embodiments.

The predetermined sequence (SYNC) is selected to have an autocorrelation function that resembles an impulse function (e.g., a relatively high center peak as compared to heights of side lobes, where the center peak is also relatively narrow, e.g., as compared to a height of the center peak). In an embodiment, the predetermined sequence (SYNC) is selected to have a zero direct current (DC) component. In an embodiment, an exhaustive search technique is used to determine a predetermined sequence (SYNC) with suitable autocorrelation and DC component properties. In one illustrative embodiment, the predetermined sequence (SYNC) is:

[−1 −1 1 −1 1 −1 1 1 −1 −1 1 1 1 1 −1 −1]

In other embodiments, the predetermined sequence (SYNC) is another suitable sequence.

As an illustrative embodiment in which N is four, the WUR sync portion 400 comprises [SYNC SYNC SYNC −SYNC]. As another illustrative embodiment in which N is six, the WUR sync portion 400 comprises [SYNC SYNC SYNC SYNC −SYNC −SYNC].

In some embodiments, each sync sequence 404 comprises one or more Golay sequences Ga. In some embodiments, each sync sequence 404 comprises one or more Golay sequences Ga, and one or more Golay sequences Gb, wherein the Golay sequence Gb is a complementary sequence to the Golay sequence Ga. Generally, the two complementary Golay sequences Ga and Gb have correlation properties suitable for detection at a receiving device. For example, the complementary Golay sequences Ga and Gb may be selected so that the sum of corresponding out-of-phase aperiodic autocorrelation coefficients of the sequences Ga and Gb is zero. In some embodiments, the complementary sequences Ga and Gb have a zero or almost-zero periodic cross-correlation. In another aspect, the sequences Ga and Gb may have aperiodic cross-correlation with a narrow main lobe and low-level side lobes, or aperiodic auto-correlation with a narrow main lobe and low-level side lobes.

In an embodiment, Ga (or, Ga and Gb) is/are selected to have a smallest DC component. In an embodiment, Ga is selected to have a duration of 2 microseconds. In another embodiment, Ga (or, Ga and Gb) are selected to have a duration of 2 microseconds. In another embodiment, Ga (or, Ga and Gb) are selected to have a duration of 4 microseconds.

In some embodiments utilizing Golay sequences, each sync sequence 404 is selected from a set consisting of two sync symbols: i) Ga, and ii) Ga rotated by 180 degrees (−Ga). For example, in an embodiment, the WUR sync portion 400 comprises a plurality of consecutive sequences Ga, and a last occurring sync sequence 404 comprising −Ga. As an illustrative embodiment in which N is four, the WUR sync portion 400 comprises [Ga Ga Ga −Ga]. As an illustrative embodiment in which N is five, the WUR sync portion 400 comprises [Ga Ga Ga Ga −Ga].

In some embodiments utilizing Golay sequences, each sync sequence 404 is selected from a set consisting of two sync symbols: i) Ga, and ii) Gb. For example, in an embodiment, the WUR sync portion 400 comprises a plurality of consecutive sequences Ga, and a last occurring sync sequence 404 comprising Gb. As an illustrative embodiment in which N is four, the WUR sync portion 400 comprises [Ga Ga Ga Gb]. As an illustrative embodiment in which N is five, the WUR sync portion 400 comprises [Ga Ga Ga Ga Gb].

In some embodiments utilizing Golay sequences, each sync sequence 404 is selected from a set consisting of two sync symbols: i) [Ga Gb], and ii) [−Ga −Gb]. For example, in an embodiment, the WUR sync portion 400 comprises one or more consecutive sequences [Ga Gb], and a last occurring sync sequence 404 comprising [−Ga −Gb]. As an illustrative embodiment in which N is three, the WUR sync portion 400 comprises [Ga Gb Ga Gb −Ga −Gb].

In some embodiments utilizing Golay sequences, each sync sequence 404 is selected from a set consisting of two sync symbols: i) [Ga Ga Gb Gb], and ii) [−Ga −Ga −Gb −Gb]. For example, in an embodiment, the WUR sync portion 400 comprises one or more consecutive sequences [Ga Ga Gb Gb], and a last occurring sync sequence 404 comprising [−Ga −Ga −Gb −Gb]. As an illustrative embodiment in which N is three, the WUR sync portion 400 comprises [Ga Ga Gb Gb −Ga −Ga −Gb −Gb].

Referring again to FIGS. 3A and 3B, in some embodiments in which a WUR sync portion (e.g., the WUR sync portion 308, the WUR sync portion 354) of a wakeup packet signals one or more PHY parameters corresponding to the data portion 232 (e.g., a data rate, a modulation scheme, a coding scheme, a length/duration, etc.), different WUR sync portion contents correspond to different PHY modes, wherein the different sync portion contents are included in a set of candidate WUR sync portions. In such embodiments, a candidate WUR sync portion is selected from the set of candidate WUR sync portions according to the PHY mode that is to be used to transmit the data portion 232 of the wakeup packet.

Figure 5A:
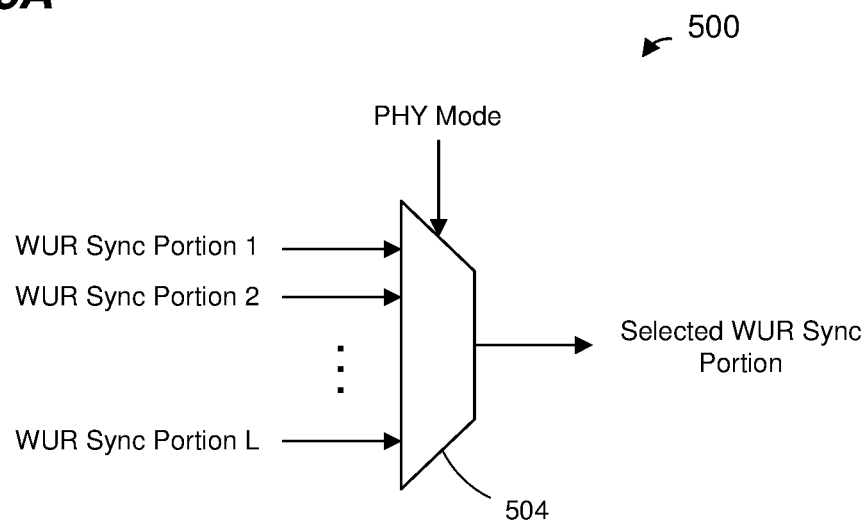
FIG. 5A is a diagram of an example WUR sync portion selection device that is included in one or more of the communication devices of FIGS. 1A-C, according to an embodiment.

FIG. 5A is a diagram of a WUR sync portion selection device 500, according to an embodiment. The WUR sync portion selection device 500 is included in a network interface such as the network interface 122 of FIGS. 1A and 1B, in an embodiment. The WUR sync portion selection device 500 is included in the PHY processor 164, in an embodiment.

The WUR sync portion selection device 500 includes a multiplexer 504. A plurality of candidate WUR sync portions are provided to a plurality of inputs of the multiplexer 504. In an embodiment, candidate WUR sync portions are stored in respective registers, and the registers are coupled to respective inputs of the multiplexer 504. A control signal is provided to a control input of the multiplexer 504. The control signal indicates a PHY mode that is to be used to transmit the data portion 232 of the wakeup packet. The control signal causes the multiplexer 504 to couple a selected one of the multiplexer inputs to an output of the multiplexer 504.

In other embodiments, the WUR sync portion selection device 500 is implemented using a hardware state machine. For example, the hardware state machine is coupled to a memory device that stores the plurality of candidate WUR sync portions in respective locations of the memory device, in an illustrative embodiment. The control signal causes the hardware state machine to select one of the locations of the memory device to read out a selected WUR sync portion from the memory device.

In other embodiments, the WUR sync portion selection device 500 is implemented using a processor executing machine readable instructions. For example, the processor is coupled to a memory device that stores the plurality of candidate WUR sync portions in respective locations of the memory device, in an illustrative embodiment. The machine readable instructions, when executed by the processor, cause the processor to select one of the locations of the memory device to read out a selected WUR sync portion from the memory device.

Referring again to FIGS. 3A and 3B, in some embodiments in which a WUR sync portion (e.g., the WUR sync portion 308, the WUR sync portion 354) of a wakeup packet signals one or more PHY parameters corresponding to the data portion 232 (e.g., a data rate, a modulation scheme, a coding scheme, a length/duration, etc.), different SYNC symbols correspond to different PHY modes, wherein the different SYNC symbols are included in a set of candidate SYNC symbols. In such embodiments, a candidate SYNC symbol is selected from the set of candidate SYNC symbols according to the PHY mode that is to be used to transmit the data portion 232 of the wakeup packet. The selected SYNC portion is then used to generate the WUR sync portion.

Figure 5B:
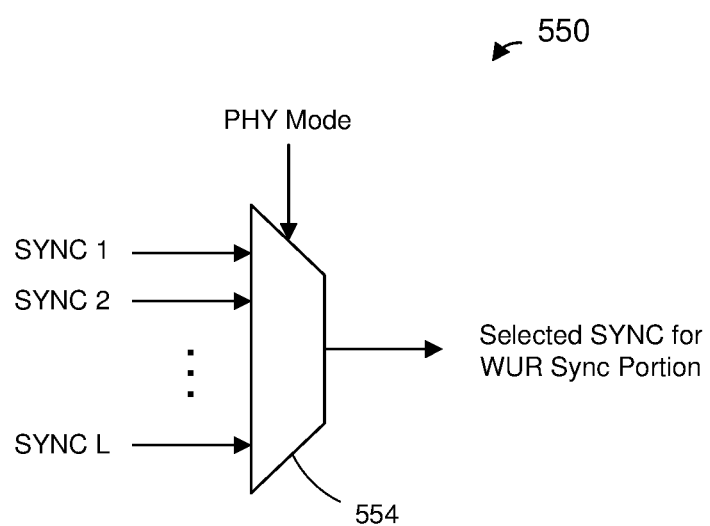
FIG. 5B is a diagram of another example WUR sync portion selection device that is included in one or more of the communication devices of FIGS. 1A-C, according to another embodiment.

FIG. 5B is a diagram of a SYNC symbol selection device 550, according to an embodiment. The SYNC symbol selection device 550 is included in a network interface such as the network interface 122 of FIGS. 1A and 1B, in an embodiment. The SYNC symbol selection device 500 is included in the PHY processor 164, in an embodiment.

The SYNC symbol selection device 500 includes a multiplexer 554. A plurality of candidate SYNC symbols are provided to a plurality of inputs of the multiplexer 554. In an embodiment, candidate SYNC symbols are stored in respective registers, and the registers are coupled to respective inputs of the multiplexer 554. A control signal is provided to a control input of the multiplexer 554. The control signal indicates a PHY mode that is to be used to transmit the data portion 232 of the wakeup packet. The control signal causes the multiplexer 554 to couple a selected one of the multiplexer inputs to an output of the multiplexer 504.

In other embodiments, the SYNC symbol selection device 550 is implemented using a hardware state machine. For example, the hardware state machine is coupled to a memory device that stores the plurality of candidate SYNC symbols in respective locations of the memory device, in an illustrative embodiment. The control signal causes the hardware state machine to select one of the locations of the memory device to read out a selected SYNC symbol from the memory device.

In other embodiments, the SYNC symbol selection device 500 is implemented using a processor executing machine readable instructions. For example, the processor is coupled to a memory device that stores the plurality of candidate SYNC symbols in respective locations of the memory device, in an illustrative embodiment. The machine readable instructions, when executed by the processor, cause the processor to select one of the locations of the memory device to read out a selected SYNC symbol from the memory device.

Figure 6:
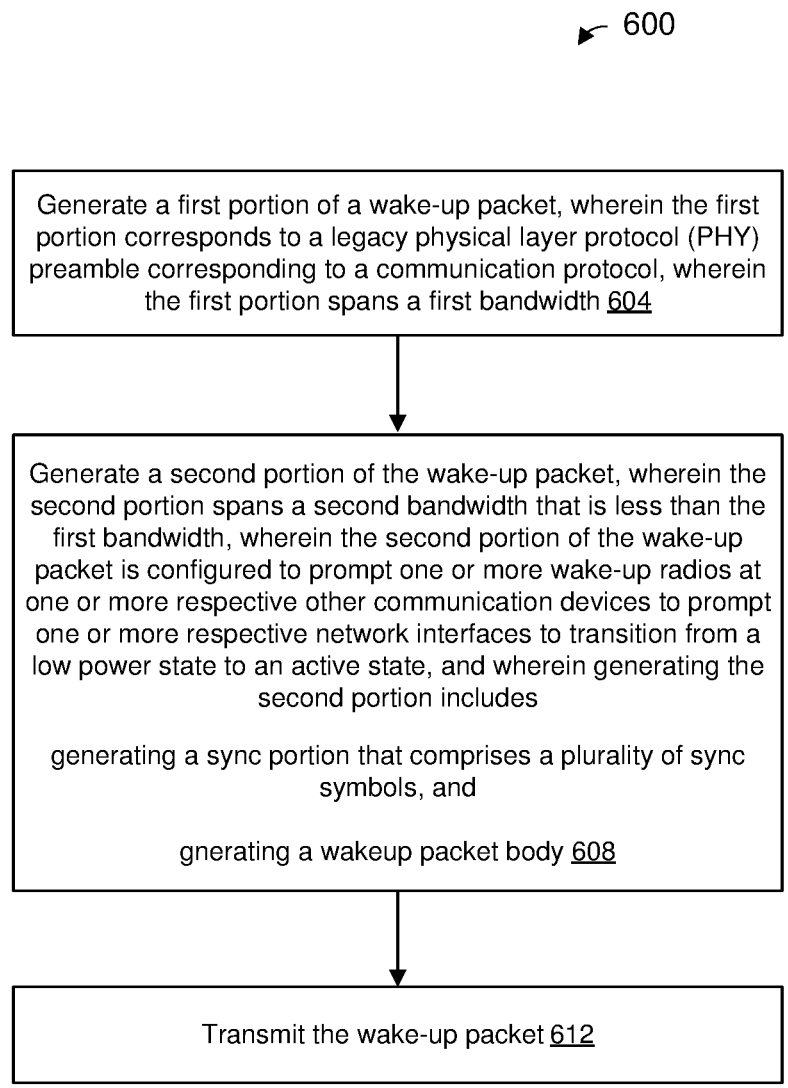
FIG. 6 is a flow diagram of an example method for generating wakeup packets, according to an embodiment.

FIG. 6 is a flow diagram of an example method 600 for generating wakeup packets, according to an embodiment. In some embodiments, the network interface device 122 of FIG. 1 is configured to implement the method 600. The method 600 is described in the context of the network interface device 122 merely for explanatory purposes and, in other embodiments, the method 600 is implemented by another suitable device, such as the network interface device 142 or another suitable network interface device.

At block 604, the network interface device 122 generates (e.g., the PHY processor 164 generates) a first portion of a wakeup packet. The first portion corresponds to a legacy PHY preamble corresponding to a communication protocol. The first portion spans a first bandwidth. In an embodiment, the legacy PHY preamble is a legacy 802.11 preamble corresponding to the protocol specified by the IEEE 802.11n Standard. The legacy PHY preamble corresponds to other communication protocols as well, such as the protocol specified by the IEEE 802.11ac Standard, the protocol specified by the IEEE 802.11ax Standard (now under development), etc., in some embodiments.

At block 608, the network interface device 122 generates a second portion of the wakeup packet. The second portion spans a second bandwidth that is less than the first bandwidth. The second portion of the wakeup packet is configured to prompt one or more wakeup radios at one or more respective communication devices to prompt one or more respective network interfaces to transition from a low power state to an active state. According to an embodiment, the second portion of the wakeup packet does not conform to the communication protocol to which the legacy PHY preamble conforms.

In some embodiments, generating the second portion of the wakeup packet includes generating a sync portion having a plurality of sync symbols. In an embodiment, the sync portion is modulated according to OOK, and each sync symbol is selected from a set consisting of i) a non-zero energy sequence, and ii) a zero energy sequence. In another embodiment in which the sync portion is modulated according to OOK, each sync symbol is selected from a set consisting of i) a non-zero energy sequence, ii) the non-zero energy sequence phase rotated by 180 degrees, and iii) a zero energy sequence.

In an embodiment, the sync portion is modulated according to a Manchester code, and each sync symbol is selected from a set consisting of i) a first sync symbol comprising a) a first occurring non-zero energy portion, and b) a second occurring zero energy portion; and ii) a second sync symbol comprising a) a first occurring zero energy portion, and b) a second occurring non-zero energy portion.

In another embodiment, each sync symbol is selected from a set consisting of i) a non-zero energy sequence, and ii) the non-zero energy sequence phase rotated by 180 degrees.

In another embodiment, each sync symbol comprises one or more Golay codes.

Generating the second portion of the wakeup packet further includes generating a wakeup packet body.

In an embodiment, the second portion of the wakeup packet is not configured to be decoded and processed by a network interface device that can decode and process data units conforming to a standard within the IEEE 802.11 Standard family.

At block 612, the network interface device 122 transmits the wakeup packet.

In some embodiments, the method 600 further includes determining, at the network interface device 122, a PHY mode according to which the wakeup packet body is to be transmitted; and selecting the sync portion from a set of candidate sync portions according to the selected PHY mode, wherein the selected sync portion indicates the PHY mode.

In some embodiments, the method 600 further includes determining, at the network interface device 122, a PHY mode according to which the wakeup packet body is to be transmitted; and selecting the sync symbol from a set of candidate sync symbol according to the selected PHY mode, wherein the selected sync symbol indicates the PHY mode.

Referring again to FIGS. 1B and 4, the LP-WUR 150 (e.g., the digital baseband circuitry 188) includes a WUR preamble detector that is configured to i) detect a WUR preamble portion (e.g., the WUR preamble portion 400) in a wakeup packet (sometimes referred to herein as carrier sensing (CS)), and ii) determine a symbol timing (ST) of the wakeup packet using the WUR preamble portion. The WUR preamble detector includes one or more correlators (e.g., autocorrelators, cross-correlators, etc.) that compute one or more correlations corresponding to sync symbols in the WUR preamble portion, according to an embodiment. For example, the one or more correlators are configured to detect sync symbols in the WUR preamble portion, according to an embodiment. The WUR preamble detector is configured to use one or more outputs of one or more correlators to detect a pattern of sync symbols in a received signal that matches a pattern of sync symbols in the WUR preamble portion. Detection of the pattern of sync symbols in the received signal indicates that the received signal includes the WUR preamble portion, according to an embodiment.

In some embodiments, the WUR preamble detector is configured to use one or more outputs of one or more correlators to a symbol timing of sync symbols in a received signal that includes the WUR preamble portion. For example, the WUR preamble detector is configured to estimate centers of peaks in the one or more outputs of the one or more correlators, and to use the estimated centers of the peaks to determine the symbol timing of sync symbols in the received signal, according to an embodiment.

In some embodiments in which the sync symbols include zero power sync symbols (e.g., OOK-modulated WUR preamble portions) or portions of sync symbols corresponding to a zero power sync signal (e.g., Manchester code-modulated WUR preamble portions), the WUR preamble detector is configured to measure one or more energy levels at one or more expected locations of zero power signals in the WUR sync portion. For example, the WUR preamble detector includes one or more energy level measurement circuits, and the WUR preamble detector uses outputs of the one or more energy level measurement circuits to detect energy levels that fall below a threshold at one or more expected locations of zero power signals in the WUR sync portion. In some embodiments, the WUR preamble detector uses outputs of the one or more energy level measurement circuits to detect one or more transitions at expected locations in the WUR sync portion where the WUR sync portion is configured to transition from a non-zero energy signal to a zero energy signal, or vice versa.

For example, with OOK-modulated WUR preamble portions, the WUR preamble detector includes one or more correlators (e.g., autocorrelators, cross-correlators, etc.) that compute one or more correlations corresponding to O (and/or M) locations in the WUR preamble portion, according to an embodiment. Also with OOK-modulated WUR preamble portions, the WUR preamble detector includes one or more energy detectors that generate one or more energy measurements corresponding to F locations in the WUR preamble portion, according to an embodiment.

For example, the WUR preamble detector compares the one or more correlations to one or more respective first thresholds to generate one or more correlation peak detection signals, according to an embodiment. As another example, the WUR preamble detector compares the one or more energy measurements to one or more respective second thresholds to generate one or more energy detection signals, according to an embodiment. As an illustrative embodiment, the WUR preamble detector compares an energy measurement to two second thresholds (an O second threshold and an F second threshold) to generate an energy detection signal that indicates when a signal energy as i) exceeded the O second threshold (corresponding to an expected O location), and ii) then fallen below the F second threshold (corresponding to an expected F location), according to an embodiment.

Figure 7:
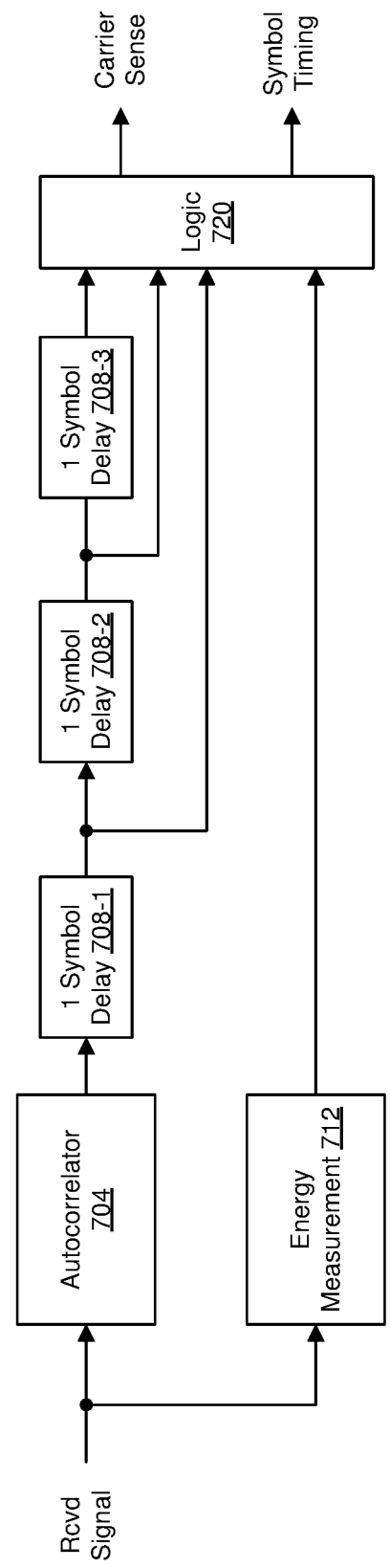
FIG. 7 is a block diagram of an example WUR preamble detector, according to an embodiment.

FIG. 7 is a block diagram of an example WUR preamble detector 700, according to an embodiment. The WUR preamble detector 700 is for use with the OOK-modulated WUR preamble portion 400 when the OOK-modulated WUR preamble portion 400 comprises five symbols: OOOOF.

The WUR preamble detector 700 comprises an autocorrelation calculator 704 coupled to three delay elements 708, which are coupled together in series. An output of the delay element 708-1 corresponds to an autocorrelation between a fourth occurring symbol in the OOK-modulated WUR preamble portion 400, and a third occurring symbol in the OOK-modulated WUR preamble portion 400. An output of the delay element 708-2 corresponds to an autocorrelation between the third occurring symbol in the OOK-modulated WUR preamble portion 400, and a second occurring symbol in the OOK-modulated WUR preamble portion 400. An output of the delay element 708-3 corresponds to an autocorrelation between the second occurring symbol in the OOK-modulated WUR preamble portion 400, and a first occurring symbol in the OOK-modulated WUR preamble portion 400.

The WUR preamble detector 700 also comprises an energy measurement device 712. An output of the energy measurement device 712 corresponds to an energy measurement of a fifth occurring symbol in the OOK-modulated WUR preamble portion 400.

The WUR preamble detector 700 also comprises logic 720, which is coupled to the output of the delay element 708-1, the output of the delay element 708-2, the output of the delay element 708-3, and the output of the energy measurement device 712. In an embodiment, the logic 720 includes three respective first comparators that are configured to compare the output of the delay element 708-1, the output of the delay element 708-2, and the output of the delay element 708-3 to respective first thresholds. For example, when the logic 720 determines the output of the delay element 708-1, the output of the delay element 708-2, and the output of the delay element 708-1 all exceed the respective first thresholds, this indicates that the received signal includes four consecutive O symbols.

In another embodiment, the logic 720 includes an adder that sums the output of the output of the delay element 708-1, the output of the delay element 708-2, and the output of the delay element 708-3. The logic 720 also includes one first comparator that compares an output of the adder to one first threshold. For example, when the logic 720 determines the output of the adder exceeds the first threshold, this indicates that the received signal includes four consecutive O symbols.

In an embodiment, the logic 720 includes two second comparators that compare the output of the energy measurement device 712 to two second thresholds (an O second threshold and an F second threshold). When the logic 720 determines that the output of the energy measurement device 712 i) first exceeds the O second threshold (corresponding to the fourth symbol in the preamble), and ii) then falls below the F second threshold (corresponding to the fifth location in the preamble), this indicates that the received signal includes an O symbol followed by an F symbol, according to an embodiment.

When the logic determines i) that the received signal includes four consecutive O symbols corresponding to the first, second, third, and fourth symbol locations in the preamble (OOOOF), and ii) that the received signal includes an O symbol (at the fourth symbol location) followed by an F symbol (at the fifth symbol location), the logic 720 determines that the preamble (OOOOF) has been detected, generates a carrier sense (CS) signal to indicate that the preamble (OOOOF) has been detected.

Additionally, the logic 720 estimates the centers of peaks in one or more of the output of the autocorrelation calculator 704, the output of the delay element 708-1, the output of the delay element 708-2, and the output of the delay element 708-3 to estimate the centers of symbols in the preamble (OOOOF), according to an embodiment. The logic 720 uses the estimated centers of symbols in the preamble (OOOOF) to generate a symbol timing (ST) signal that indicates the centers of symbols in the preamble (OOOOF), according to an embodiment.

In an embodiment, the logic 720 comprises hardware circuitry (e.g., one or more comparator circuits, one or more adder circuits, one or more state machine circuits, etc.) configured to implement the functions described above. In another embodiment, the logic 720 is implemented using a processor executing machine readable instructions stored in a memory device, wherein the machined readable instructions, when executed by the processor, cause the processor to implement the functions described above. In another embodiment, the logic 720 comprises a combination of i) hardware circuitry (e.g., one or more comparator circuits, one or more adder circuits, one or more state machine circuits, etc.) and ii) a processor executing machined readable instructions, that together implement the functions described above.

Although the example WUR preamble detector 700 includes a single autocorrelator 704, the WUR preamble detector 700 includes multiple autocorrelators corresponding to multiple locations in the WUR sync portion at which two consecutive O symbols occur, in another embodiment. In other embodiments, the autocorrelator 704 (and/or one or more other autocorrelators) in the WUR preamble detector 700 are replaced with one or more cross-correlators that are configured to cross-correlate the received signal with one or more local copies of sync symbols in the WUR sync portion.

With Manchester code encoded WUR preamble portions, the WUR preamble detector includes one or more correlators (e.g., autocorrelators, cross-correlators, etc.) that compute one or more correlations corresponding to locations in the WUR preamble portion at which a non-zero energy signal is present, according to an embodiment. Also with Manchester code encoded WUR preamble portions, the WUR preamble detector includes one or more energy detectors that generate one or more energy measurements corresponding to locations in the WUR sync portion at which the zero energy signal is present, according to an embodiment.

In embodiments in which the WUR sync portion is modulated using a techniques other than OOK or Manchester code encoding, the WUR preamble detector includes one or more correlators (e.g., autocorrelators, cross-correlators, etc.) that compute one or more correlations corresponding to locations of sync symbols in the WUR sync portion. For example, if the WUR sync portion includes two consecutive sync symbols with a same signal, the WUR preamble detector uses an autocorrelation to detect two consecutive sync symbols in a received signal, according to an embodiment. Additionally or alternatively, the WUR preamble detector uses a cross-correlation to detect a sync symbol in a received signal, according to an embodiment.

Figure 8:
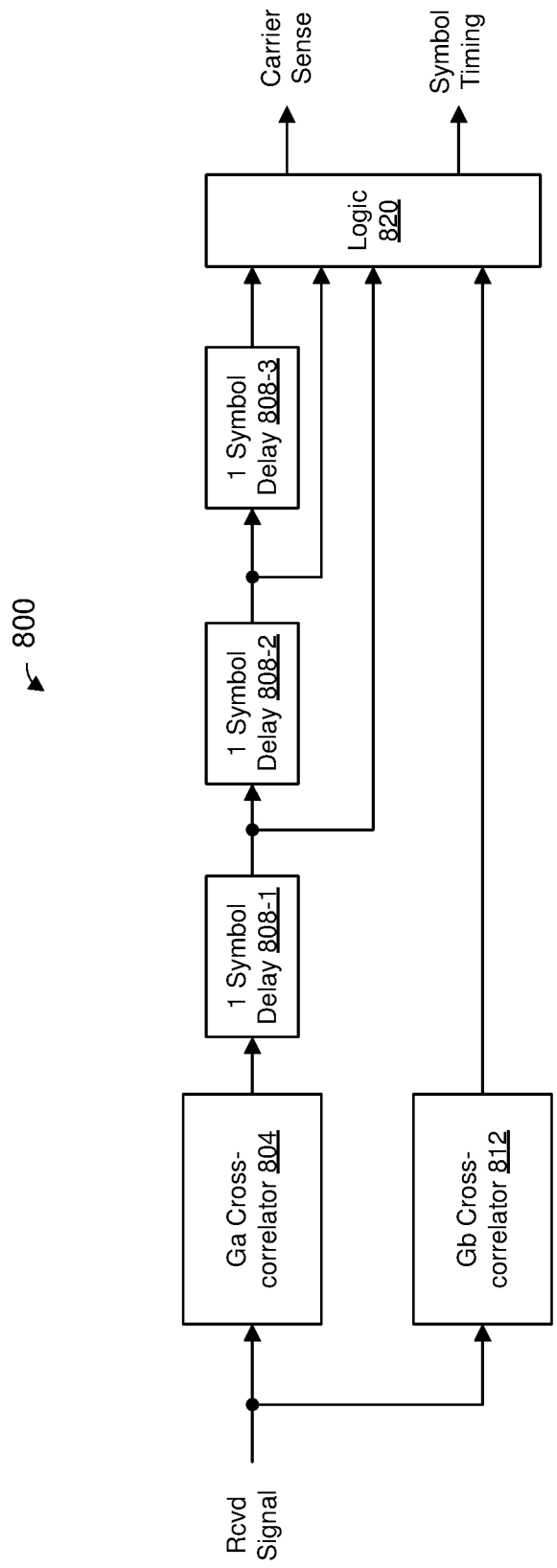
FIG. 8 is a block diagram of another example WUR preamble detector, according to another embodiment.

FIG. 8 is a block diagram of another example WUR preamble detector 800, according to another embodiment. The WUR preamble detector 800 is for use with a Golay code-modulated WUR preamble portion 400 when the Golay code-modulated WUR preamble portion 400 comprises four symbols: Ga Ga Ga Gb.

The WUR preamble detector 800 comprises a first cross-correlation calculator 804 coupled to three delay elements 808, which are coupled together in series. The first cross-correlation calculator 804 is configured to compute a cross-correlation between a received signal and the Golay code Ga. An output of the delay element 808-1 corresponds to a cross-correlation between a third occurring symbol in the WUR preamble portion 400 and Ga. An output of the delay element 808-2 corresponds to a cross-correlation between a second occurring symbol in the WUR preamble portion 400 and Ga. An output of the delay element 808-3 corresponds to a cross-correlation between a first occurring symbol in the WUR preamble portion 400 and Ga.

The WUR preamble detector 800 also comprises a second cross-correlation calculator 812. The second cross-correlation calculator 812 is configured to compute a cross-correlation between the received signal and the Golay code Gb. An output of the second cross-correlation calculator 812 corresponds to a cross-correlation between a fourth occurring symbol in the WUR preamble portion 400 and Gb.

The WUR preamble detector 800 also comprises logic 820, which is coupled to the output of the delay element 808-1, the output of the delay element 808-2, the output of the delay element 808-3, and the output of the second cross-correlation calculator 812. In an embodiment, the logic 820 includes three respective first comparators that are configured to compare the output of the delay element 808-1, the output of the delay element 808-2, and the output of the delay element 808-3 to respective first thresholds. For example, when the logic 820 determines the output of the delay element 808-1, the output of the delay element 808-2, and the output of the delay element 808-3 all exceed the respective first thresholds, this indicates that the received signal includes three consecutive Ga symbols.

In another embodiment, the logic 820 includes an adder that sums the output of the output of the delay element 808-1, the output of the delay element 808-2, and the output of the delay element 808-3. The logic 820 also includes one first comparator that compares an output of the adder to one first threshold. For example, when the logic 820 determines the output of the adder exceeds the first threshold, this indicates that the received signal includes three consecutive Ga symbols.

In an embodiment, the logic 820 includes a second comparator that compares the output of the second cross-correlation calculator 812 to a second threshold. When the logic 820 determines that the output of the second cross-correlation calculator 812 exceeds the second threshold, this indicates that the received signal includes the Gb symbol, according to an embodiment.

In another embodiment, the logic 820 includes an adder that sums the output of the output of the delay element 808-1, the output of the delay element 808-2, the output of the delay element 808-3, and the output of the second cross-correlation calculator 812. The logic 820 also includes one comparator that compares an output of the adder to a threshold. For example, when the logic 820 determines the output of the adder exceeds the threshold, this indicates that the received signal includes three consecutive Ga symbols followed by a Gb symbol.

When the logic determines i) that the received signal includes three consecutive Ga symbols corresponding to the first, second, and third symbol locations in the preamble, and ii) that the received signal includes a Gb symbol at the fourth symbol location, the logic 820 determines that the preamble (Ga Ga Ga Gb) has been detected, and generates a carrier sense (CS) signal to indicate that the preamble (Ga Ga Ga Gb) has been detected.

Additionally, the logic 820 estimates the centers of peaks in one or more of the output of the first cross-correlation calculator 804, the output of the delay element 808-1, the output of the delay element 808-2, the output of the delay element 808-3, and the output of the second cross-correlation calculator 812 to estimate the centers of symbols in the preamble, according to an embodiment. The logic 820 uses the estimated centers of symbols in the preamble to generate a symbol timing (ST) signal that indicates the centers of symbols in the preamble, according to an embodiment.

In an embodiment, the logic 820 comprises hardware circuitry (e.g., one or more comparator circuits, one or more adder circuits, one or more state machine circuits, etc.) configured to implement the functions described above. In another embodiment, the logic 820 is implemented using a processor executing machine readable instructions stored in a memory device, wherein the machined readable instructions, when executed by the processor, cause the processor to implement the functions described above. In another embodiment, the logic 820 comprises a combination of i) hardware circuitry (e.g., one or more comparator circuits, one or more adder circuits, one or more state machine circuits, etc.) and ii) a processor executing machined readable instructions, that together implement the functions described above.

Although the example WUR preamble detector 800 includes a single first cross-correlation calculator 804, the WUR preamble detector 800 includes multiple first cross-correlation calculators 804 corresponding to multiple locations in the WUR sync portion at which Ga symbols occur, in another embodiment. In other embodiments, the first cross-correlation calculator 804 is replaced with one or more autocorrelators that are configured to generate an autocorrelation of the received signal to detect two consecutive Ga symbols in the received signal.

Figure 9:
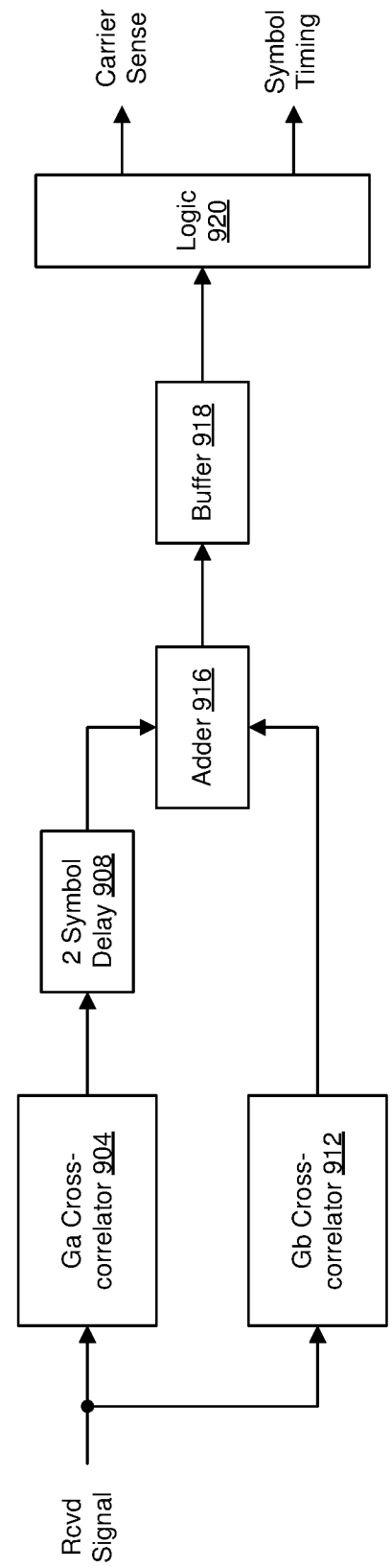
FIG. 9 is a block diagram of another example WUR preamble detector, according to another embodiment.

FIG. 9 is a block diagram of another example WUR preamble detector 900, according to another embodiment. The WUR preamble detector 900 is for use with a Golay code-modulated WUR preamble portion 400 when the Golay code-modulated WUR preamble portion 400 comprises four symbols: Ga Ga Gb Gb.

The WUR preamble detector 900 comprises a first cross-correlation calculator 904 coupled to a delay element 908. The first cross-correlation calculator 904 is configured to compute a cross-correlation between a received signal and the Golay code Ga. An output of the delay element 908 corresponds to a cross-correlation between a first occurring symbol and a second occurring symbol the WUR preamble portion 400 and Ga.

The WUR preamble detector 800 also comprises a second cross-correlation calculator 912. The second cross-correlation calculator 912 is configured to compute a cross-correlation between the received signal and the Golay code Gb. An output of the second cross-correlation calculator 912 corresponds to a cross-correlation between a third occurring symbol and a fourth occurring symbol in the WUR preamble portion 400 and Gb.

The WUR preamble detector 900 also comprises an adder 916, which is coupled to the output of the delay element 908, and the output of the second cross-correlation calculator 912. An output of the adder 916 is coupled to a buffer 918. In an embodiment, the buffer 918 is configured to store at least K outputs of the adder 916. When the received signal includes the WUR preamble portion 400 Ga Ga Gb Gb, the output of the adder 916 will a first sample equal to approximately 2*K, K−1 second samples of zeros (or near zero), and then a third sample equal to approximately 2*K.

The WUR preamble detector 900 also comprises logic 920, which is coupled to the output of the buffer 918. In an embodiment, the logic 920 is configured to detect when the output of the adder 916 includes the first sample equal to approximately 2*K, K−1 second samples of zeros (or near zero), and then the third sample equal to approximately 2*K. In response, the logic 920 generates a carrier sense (CS) signal to indicate that the preamble (Ga Ga Gb Gb) has been detected. Additionally, the logic 920 uses the first sample equal to approximately 2*K, K−1 second samples of zeros (or near zero), and then the third sample equal to approximately 2*K to generate a symbol timing (ST) signal that indicates the centers of symbols in the preamble, according to an embodiment.

In an embodiment, the logic 920 comprises hardware circuitry (e.g., one or more comparator circuits, one or more state machine circuits, etc.) configured to implement the functions described above. In another embodiment, the logic 920 is implemented using a processor executing machine readable instructions stored in a memory device, wherein the machined readable instructions, when executed by the processor, cause the processor to implement the functions described above. In another embodiment, the logic 920 comprises a combination of i) hardware circuitry (e.g., one or more comparator circuits, one or more state machine circuits, etc.) and ii) a processor executing machined readable instructions, that together implement the functions described above.

As discussed above, different WUR sync portions and/or different sync symbols are utilized to indicate different PHY modes of a wakeup packet, at least in some embodiments. Thus, in some embodiments, the LP-WUR 150 includes multiple WUR preamble detectors to detect different WUR sync portions corresponding to the different PHY modes. For example, which one of the multiple WUR preamble detectors detects a WUR preamble indicates a PHY mode of the wakeup packet, according to an embodiment.

In other embodiments, the WUR preamble detector includes different cross-correlators corresponding to different sync symbols, and the WUR preamble detector uses the different cross-correlators to detect WUR sync portions using techniques such as described above. For example, which one of the cross-correlators detects a sync symbol in a WUR preamble indicates a PHY mode of the wakeup packet, according to an embodiment.

Figure 10:
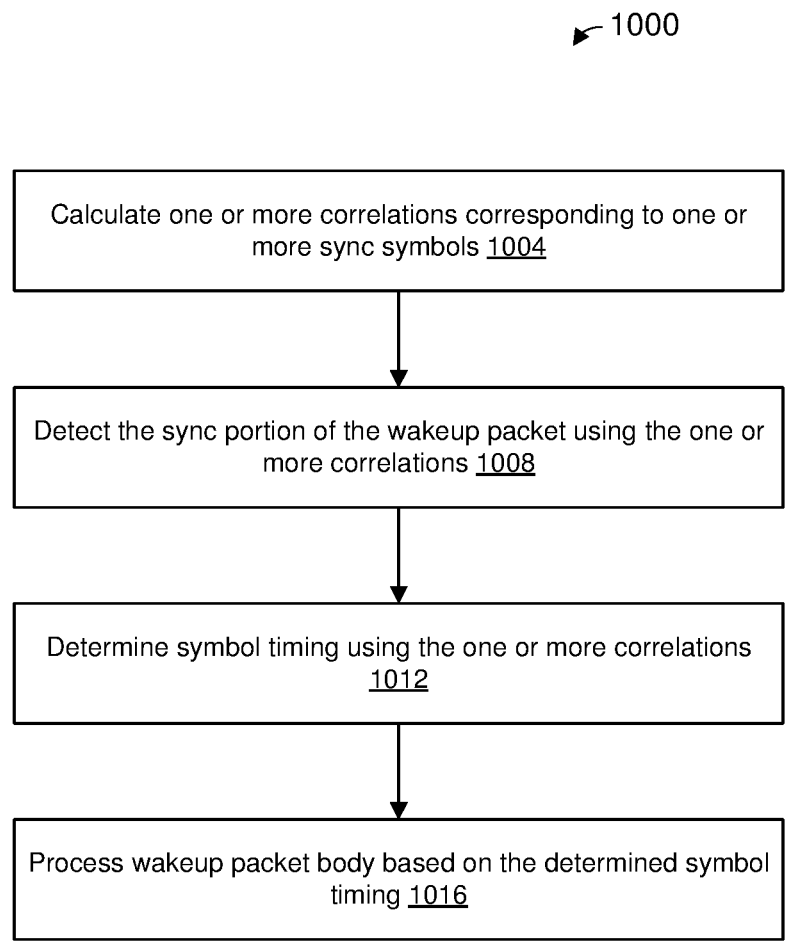
FIG. 10 is a flow diagram of an example method for processing a wakeup packet, according to an embodiment.

FIG. 10 is a flow diagram of an example method 1000 for processing wakeup packets, according to an embodiment. In some embodiments, the LP-WUR 150 of FIGS. 1A and 1D is configured to implement the method 1000. The method 1000 is described in the context of the LP-WUR 150 merely for explanatory purposes and, in other embodiments, the method 1000 is implemented by another network interface device.

At block 1004, the LP-WUR 150 calculates (e.g., the digital baseband circuitry 188 calculates) one or more correlations on a received signal. The one or more correlations correspond to one or more sync symbols included in a sync portion of a wakeup packet. The wakeup packet includes i) a first portion having a WLAN legacy preamble that spans a first frequency bandwidth, and ii) a second portion that follows in time the first portion and that spans a second bandwidth narrower than the first bandwidth. The second portion includes i) the sync portion having a plurality of sync symbols, and ii) a wakeup packet body.

At block 1008, the LP-WUR 150 detects (e.g., the digital baseband circuitry 188 detects) the sync portion of the wakeup packet using the one or more correlations.

At block 1012, the LP-WUR 150 determines (e.g., the digital baseband circuitry 188 determines) a symbol timing using the one or more correlations.

At block 1016, the LP-WUR 150 processes (e.g., the digital baseband circuitry 188 processes) the wakeup packet body based on the determined symbol timing.

In some embodiments, the sync portion is modulated according to OOK; each sync symbol is selected from a set consisting of i) a non-zero energy sequence, and ii) a zero energy sequence; calculating the one or more correlations comprises: generating, at the WUR, one or more respective autocorrelations between expected adjacent sync symbols corresponding to the non-zero energy sequence, and measuring, at the WUR, one or more energy levels of expected sync symbols corresponding to the zero energy sequence; detecting the WUR preamble comprises using the one or more respective generated autocorrelations and the one or more measured energy levels; and determining the symbol timing comprises using the one or more respective generated autocorrelations.

In an embodiment, determining the symbol timing further comprises using the one or more measured energy levels.

In some embodiment, the sync portion is modulated according to on-off keying (OOK); each sync symbol is selected from a set consisting of i) a non-zero energy sequence, ii) the non-zero energy sequence phase rotated by 180 degrees, and iii) a zero energy sequence; the method further comprises: generating, at the WUR, one or more respective correlations at expected sync symbols corresponding to the non-zero energy sequence and the non-zero energy sequence phase rotated by 180 degrees, and measuring, at the WUR, one or more energy levels at expected sync symbols corresponding to the zero energy sequence; detecting the WUR preamble comprises using the one or more respective generated correlations and the one or more measured energy levels; and determining the symbol timing comprises using the one or more respective generated autocorrelations.

In an embodiment, determining the symbol timing further comprises using the one or more measured energy levels.

In some embodiments, the sync portion is modulated according to a Manchester code; each sync symbol is selected from a set consisting of i) a first sync symbol comprising a) a first occurring non-zero energy portion, and b) a second occurring zero energy portion; and ii) a second sync symbol comprising a) a first occurring zero energy portion, and b) a second occurring non-zero energy portion; the method further comprises: generating, at the WUR, one or more respective correlations at expected non-zero energy portions, and measuring, at the WUR, one or more energy levels at expected zero energy portions; detecting the WUR preamble comprises using the one or more respective generated correlations and the one or more measured energy levels; and determining the symbol timing comprises using the one or more respective generated autocorrelations.

In an embodiment, determining the symbol timing further comprises using the one or more measured energy levels.

In some embodiments, each sync symbol is selected from a set consisting of i) a non-zero energy sequence, and ii) the non-zero energy sequence phase rotated by 180 degrees; the method further comprises: generating, at the WUR, one or more respective correlations regarding the WUR preamble; detecting the WUR preamble comprises using the one or more respective generated correlations; and determining the symbol timing comprises using the one or more respective generated autocorrelations.

In some embodiments, each sync symbol comprises one or more Golay codes; the method further comprises: generating, at the WUR, one or more respective correlations regarding the WUR preamble; detecting the WUR preamble comprises using the one or more respective generated correlations; and determining the symbol timing comprises using the one or more respective generated autocorrelations.

In some embodiments, the method further comprises: determining, at the WUR, a matching sync portion from a set of candidate sync portions that is included in the WUR preamble; and determining, at the WUR, a physical layer (PHY) mode according to which the wakeup packet body was transmitted based on the determined matching sync portion; wherein processing the wakeup packet body is performed in accordance with the determined PHY mode.

In some embodiments, the method further comprises: determining, at the WUR, a matching sync symbol from a set of candidate sync symbols that is included in the WUR preamble; and determining, at the WUR, a physical layer (PHY) mode according to which the wakeup packet body was transmitted based on the determined matching sync symbol; wherein processing the wakeup packet body is performed in accordance with the determined PHY mode.

Embodiment 1

A method, performed by a first communication device, for transmitting a wakeup packet configured to cause a wakeup radio of a second communication device to cause a wireless local area network (WLAN) network interface device of the second communication device to transition from a low power state to an active state, the method comprising: generating, at the first communication device, a first portion of the wakeup packet, wherein the first portion of the wakeup packet corresponds to a WLAN legacy preamble of the wakeup packet, and wherein the first portion spans a first frequency bandwidth; generating, at the first communication device, a second portion of the wakeup packet, wherein the second portion of the wakeup packet spans a second bandwidth that is less than the first bandwidth, and wherein: the second portion of the wakeup packet is configured to cause the wakeup radio of the second communication device to cause the WLAN network interface device of the second communication device to transition from the low power state to the active state, generating the second portion of the wakeup packet includes i) generating a sync portion having a plurality of sync symbols, and ii) generating a wakeup packet body; and transmitting, by the first communication device, the wakeup packet.

Embodiment 2

The method of Embodiment 1, wherein generating the sync portion comprises: modulating the sync portion according to on-off keying (OOK); and selecting each sync symbol from a set consisting of i) a non-zero energy sequence, and ii) a zero energy sequence.

Embodiment 3

The method of Embodiment 1, wherein generating the sync portion comprises: modulating the sync portion according to on-off keying (OOK); and selecting each sync symbol from a set consisting of i) a non-zero energy sequence, ii) the non-zero energy sequence phase rotated by 180 degrees, and iii) a zero energy sequence.

Embodiment 4

The method of Embodiment 1, wherein generating the sync portion comprises: modulating the sync portion according to a Manchester code; and selecting each sync symbol from a set consisting of i) a first sync symbol comprising a) a first occurring non-zero energy portion, and b) a second occurring zero energy portion; and ii) a second sync symbol comprising a) a first occurring zero energy portion, and b) a second occurring non-zero energy portion.

Embodiment 5

The method of Embodiment 1, wherein generating the sync portion comprises: selecting each sync symbol from a set consisting of i) a non-zero energy sequence, and ii) the non-zero energy sequence phase rotated by 180 degrees.

Embodiment 6

The method of Embodiment 1, wherein: each sync symbol comprises one or more Golay codes.

Embodiment 7

The method of any of Embodiments 1-6, further comprising: determining, at the first communication device, a physical layer (PHY) mode according to which the wakeup packet body is to be transmitted; and selecting, at the first communication device, the sync portion from a set of candidate sync portions according to the selected PHY mode, wherein the selected sync portion indicates the PHY mode.

Embodiment 8

The method of any of Embodiments 1-6, further comprising: determining, at the first communication device, a PHY mode according to which the wakeup packet body is to be transmitted; and selecting, at the first communication device, a sync symbol to use for the sync portion from a set of candidate sync symbols according to the selected PHY mode, wherein the selected sync symbol indicates the PHY mode.

Embodiment 9

An apparatus, comprising: a network interface device associated with a first communication device, wherein the network interface device comprises one or more integrated circuit (IC) devices configured to: generate a wireless local area network (WLAN) legacy preamble of a wakeup packet, wherein the wakeup packet is configured to cause a wakeup radio of a second communication device to cause a WLAN network interface device of the second communication device to transition from a low power state to an active state, generate a first portion of a wakeup packet, wherein the first portion of the wakeup packet corresponds to a wireless local area network (WLAN) legacy preamble of the wakeup packet, and wherein the first portion spans a first frequency bandwidth, generate a second portion of the wakeup packet, wherein the second portion of the wakeup packet spans a second bandwidth that is less than the first bandwidth, and wherein: the second portion of the wakeup packet is configured to cause a wakeup radio of a second communication device to cause a WLAN network interface device of the second communication device to transition from a low power state to an active state, and generating the second portion of the wakeup packet includes i) generating a sync portion having a plurality of sync symbols, and ii) generating a wakeup packet body; wherein the one or more IC devices are further configured to transmit the wakeup packet.

Embodiment 10

The apparatus of Embodiment 9, wherein the one or more IC devices are further configured to: modulate the sync portion according to on-off keying (OOK); and select each sync symbol from a set consisting of i) a non-zero energy sequence, and ii) a zero energy sequence.

Embodiment 11

The apparatus of Embodiment 9, wherein the one or more IC devices are further configured to: modulate the sync portion according to on-off keying (OOK); and select each sync symbol from a set consisting of i) a non-zero energy sequence, ii) the non-zero energy sequence phase rotated by 180 degrees, and iii) a zero energy sequence.

Embodiment 12

The apparatus of Embodiment 9, wherein the one or more IC devices are further configured to: modulate the sync portion according to a Manchester code; and select each sync symbol from a set consisting of i) a first sync symbol comprising a) a first occurring non-zero energy portion, and b) a second occurring zero energy portion; and ii) a second sync symbol comprising a) a first occurring zero energy portion, and b) a second occurring non-zero energy portion.

Embodiment 13

The apparatus of Embodiment 9, wherein the one or more IC devices are further configured to: select each sync symbol from a set consisting of i) a non-zero energy sequence, and ii) the non-zero energy sequence phase rotated by 180 degrees.

Embodiment 14

The apparatus of Embodiment 9, wherein: each sync symbol comprises one or more Golay codes.

Embodiment 15

The apparatus of any of Embodiments 9-14, wherein the one or more IC devices are further configured to: determine a physical layer (PHY) mode according to which the wakeup packet body is to be transmitted; and select the sync portion from a set of candidate sync portions according to the selected PHY mode, wherein the selected sync portion indicates the PHY mode.

Embodiment 16

The apparatus of any of Embodiments 9-14, wherein the one or more IC devices are further configured to: determine a PHY mode according to which the wakeup packet body is to be transmitted; and select a sync symbol to use for the sync portion from a set of candidate sync symbols according to the selected PHY mode, wherein the selected sync symbol indicates the PHY mode.

Embodiment 17

A method, performed by a wakeup radio (WUR) of a communication device, for processing a wakeup packet configured to cause the WUR of the communication device to cause a wireless local area network (WLAN) network interface device of the communication device to transition from a low power state to an active state, wherein the wakeup packet includes i) a first portion having a WLAN legacy preamble that spans a first frequency bandwidth, and ii) a second portion that follows in time the first portion and that spans a second bandwidth narrower than the first bandwidth, and wherein the second portion includes i) a sync portion having a plurality of sync symbols, and ii) a wakeup packet body, the method comprising: calculating, at the WUR, one or more correlations corresponding to one or more sync symbols included in the sync portion; detecting, at the WUR, the sync portion of the wakeup packet using the one or more correlations; determining, at the WUR, a symbol timing using the one or more correlations; and processing, at the WUR, the wakeup packet body based on the determined symbol timing.

Embodiment 18

The method of Embodiment 17, wherein: the sync portion is modulated according to on-off keying (OOK); each sync symbol is selected from a set consisting of i) a non-zero energy sequence, and ii) a zero energy sequence; calculating the one or more correlations comprises: generating, at the WUR, one or more respective autocorrelations between expected adjacent sync symbols corresponding to the non-zero energy sequence, and measuring, at the WUR, one or more energy levels of expected sync symbols corresponding to the zero energy sequence; detecting the sync portion comprises using the one or more respective generated autocorrelations and the one or more measured energy levels; and determining the symbol timing comprises using the one or more respective generated autocorrelations.

Embodiment 19

The method of Embodiment 18, wherein: determining the symbol timing further comprises using the one or more measured energy levels.

Embodiment 20

The method of Embodiment 17, wherein: the sync portion is modulated according to on-off keying (OOK); each sync symbol is selected from a set consisting of i) a non-zero energy sequence, ii) the non-zero energy sequence phase rotated by 180 degrees, and iii) a zero energy sequence; the method further comprises: generating, at the WUR, one or more respective correlations at expected sync symbols corresponding to the non-zero energy sequence and the non-zero energy sequence phase rotated by 180 degrees, and measuring, at the WUR, one or more energy levels at expected sync symbols corresponding to the zero energy sequence; detecting the sync portion comprises using the one or more respective generated correlations and the one or more measured energy levels; and determining the symbol timing comprises using the one or more respective generated autocorrelations.

Embodiment 21

The method of Embodiment 20, wherein: determining the symbol timing further comprises using the one or more measured energy levels.

Embodiment 22

The method of Embodiment 17, wherein: the sync portion is modulated according to a Manchester code; each sync symbol is selected from a set consisting of i) a first sync symbol comprising a) a first occurring non-zero energy portion, and b) a second occurring zero energy portion; and ii) a second sync symbol comprising a) a first occurring zero energy portion, and b) a second occurring non-zero energy portion; the method further comprises: generating, at the WUR, one or more respective correlations at expected non-zero energy portions, and measuring, at the WUR, one or more energy levels at expected zero energy portions; detecting the sync portion comprises using the one or more respective generated correlations and the one or more measured energy levels; and determining the symbol timing comprises using the one or more respective generated autocorrelations.

Embodiment 23

The method of Embodiment 22, wherein: determining the symbol timing further comprises using the one or more measured energy levels.

Embodiment 24

The method of Embodiment 17, wherein: each sync symbol is selected from a set consisting of i) a non-zero energy sequence, and ii) the non-zero energy sequence phase rotated by 180 degrees; the method further comprises: generating, at the WUR, one or more respective correlations regarding the sync portion; detecting the sync portion comprises using the one or more respective generated correlations; and determining the symbol timing comprises using the one or more respective generated autocorrelations.

Embodiment 25

The method of Embodiment 17, wherein: each sync symbol comprises one or more Golay codes; the method further comprises: generating, at the WUR, one or more respective correlations regarding the sync portion; detecting the sync portion comprises using the one or more respective generated correlations; and determining the symbol timing comprises using the one or more respective generated autocorrelations.

Embodiment 26

The method of any of Embodiments 17-25, further comprising: determining, at the WUR, a matching sync portion from a set of candidate sync portions that is included in the sync portion; and determining, at the WUR, a physical layer (PHY) mode according to which the wakeup packet body was transmitted based on the determined matching sync portion; wherein processing the wakeup packet body is performed in accordance with the determined PHY mode.

Embodiment 27

The method of any of Embodiments 17-25, further comprising: determining, at the WUR, a matching sync symbol from a set of candidate sync symbols that is included in the sync portion; and determining, at the WUR, a physical layer (PHY) mode according to which the wakeup packet body was transmitted based on the determined matching sync symbol; wherein processing the wakeup packet body is performed in accordance with the determined PHY mode.

Embodiment 28

An apparatus, comprising: a wakeup radio WUR associated with a wireless local area network (WLAN) network interface device, wherein the WUR comprises one or more integrated circuit (IC) devices configured to: process a wakeup packet, wherein the wakeup packet includes i) a first portion having a WLAN legacy preamble that spans a first frequency bandwidth, and ii) a second portion that follows in time the first portion and that spans a second bandwidth narrower than the first bandwidth, and wherein the second portion includes i) the sync portion having a plurality of sync symbols, and ii) a wakeup packet body. Processing the wakeup packet includes: calculating one or more correlations corresponding to one or more sync symbols included in the sync portion, detecting the sync portion of the wakeup packet using the one or more correlations, determining a symbol timing using the one or more correlations, and processing the wakeup packet body based on the determined symbol timing.

Embodiment 29

The apparatus of Embodiment 28, wherein: the sync portion is modulated according to on-off keying (OOK); each sync symbol is selected from a set consisting of i) a non-zero energy sequence, and ii) a zero energy sequence; the one or more IC devices are configured to: generate one or more respective autocorrelations between expected adjacent sync symbols corresponding to the non-zero energy sequence, and measure one or more energy levels of expected sync symbols corresponding to the zero energy sequence, detect the sync portion using the one or more respective generated autocorrelations and the one or more measured energy levels, and determine the symbol timing using the one or more respective generated autocorrelations.

Embodiment 30

The apparatus of Embodiment 29, wherein the one or more IC devices are configured to: determine the symbol timing using the one or more measured energy levels.

Embodiment 31

The apparatus of Embodiment 28, wherein: the sync portion is modulated according to on-off keying (OOK); each sync symbol is selected from a set consisting of i) a non-zero energy sequence, ii) the non-zero energy sequence phase rotated by 180 degrees, and iii) a zero energy sequence; the one or more IC devices are configured to: generate one or more respective correlations at expected sync symbols corresponding to the non-zero energy sequence and the non-zero energy sequence phase rotated by 180 degrees, measure one or more energy levels at expected sync symbols corresponding to the zero energy sequence, detect the sync portion using the one or more respective generated correlations and the one or more measured energy levels, and determine the symbol timing using the one or more respective generated autocorrelations.

Embodiment 32

The apparatus of Embodiment 31, wherein the one or more IC devices are configured to: determine the symbol timing using the one or more measured energy levels.

Embodiment 33

The apparatus of Embodiment 28, wherein: the sync portion is modulated according to a Manchester code; each sync symbol is selected from a set consisting of i) a first sync symbol comprising a) a first occurring non-zero energy portion, and b) a second occurring zero energy portion; and ii) a second sync symbol comprising a) a first occurring zero energy portion, and b) a second occurring non-zero energy portion; the one or more IC devices are configured to: generate one or more respective correlations at expected non-zero energy portions, measure one or more energy levels at expected zero energy portions, detect the sync portion using the one or more respective generated correlations and the one or more measured energy levels, and determine the symbol timing using the one or more respective generated autocorrelations.

Embodiment 34

The apparatus of Embodiment 33, wherein the one or more IC devices are configured to: determine the symbol timing using the one or more measured energy levels.

Embodiment 35

The apparatus of Embodiment 28, wherein: each sync symbol is selected from a set consisting of i) a non-zero energy sequence, and ii) the non-zero energy sequence phase rotated by 180 degrees; the one or more IC devices are configured to: generate one or more respective correlations regarding the sync portion, detect the sync portion using the one or more respective generated correlations, and determine the symbol timing using the one or more respective generated autocorrelations.

Embodiment 36

The apparatus of Embodiment 28, wherein: each sync symbol comprises one or more Golay codes; the one or more IC devices are configured to: generate one or more respective correlations regarding the sync portion, detect the sync portion comprises using the one or more respective generated correlations, and determine the symbol timing using the one or more respective generated autocorrelations.

Embodiment 37

The apparatus of any of Embodiments 28-36, wherein the one or more IC devices are configured to: determine a matching sync portion from a set of candidate sync portions that is included in the second portion of the wakeup packet; determine a physical layer (PHY) mode according to which the wakeup packet body was transmitted based on the determined matching sync portion; and process the wakeup packet body in accordance with the determined PHY mode.

Embodiment 38

The apparatus of any of Embodiments 28-36, wherein the one or more IC devices are configured to: determine a matching sync symbol from a set of candidate sync symbols that is included in the second portion of the wakeup packet; determine a physical layer (PHY) mode according to which the wakeup packet body was transmitted based on the determined matching sync symbol; and process the wakeup packet body in accordance with the determined PHY mode.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, performed by a first communication device, for transmitting a wakeup packet, the method comprising:
   determining, at a first communication device, a data rate for a wakeup packet body of the wakeup packet;
   selecting, at the first communication device, a sync portion for the wakeup packet from a set of multiple candidate sync portions based on the determined data rate, wherein the multiple candidate sync portions in the set are configured to indicate respective data rates, and wherein each candidate sync portion comprises a respective plurality of on-off keying-modulated (OOK-modulated) sync symbols;
   generating, at the first communication device, a first portion of the wakeup packet, wherein the first portion of the wakeup packet corresponds to a wireless local area network (WLAN) legacy preamble of the wakeup packet, and wherein the first portion spans a first frequency bandwidth;
   generating, at the first communication device, a second portion of the wakeup packet, wherein the second portion of the wakeup packet spans a second bandwidth that is less than the first bandwidth, and wherein:
      generating the second portion of the wakeup packet includes i) generating the selected sync portion to indicate to the second communication device the determined data rate of the wakeup packet body, and ii) generating the wakeup packet body according to the determined data rate, wherein generating the selected sync portion includes selecting each sync symbol in the selected sync portion from a set including a) a non-zero energy sequence and b) a zero energy sequence to enable the second communication device to:
         detect the sync portion based on i) one or more respective autocorrelations, generated at the second communication device, between expected adjacent sync symbols corresponding to the non-zero energy sequence and ii) one or more energy levels, measured at the second communication device, of expected sync symbols corresponding to the zero energy sequence, and
         determine a symbol timing using the one or more respective autocorrelations; and
   transmitting, by the first communication device, the wakeup packet.

2. The method of claim 1, wherein generating the sync portion comprises:
   selecting each sync symbol in the selected sync portion from the set further including the non-zero energy sequence phase rotated by 180 degrees.

3. An apparatus, comprising:
   a network interface device associated with a first communication device, wherein the network interface device comprises one or more integrated circuit (IC) devices configured to:
   determine a data rate for a wakeup packet body of a wakeup packet,
   select a sync portion for the wakeup packet from a set of multiple candidate sync portions based on the determined data rate, wherein the multiple candidate sync portions in the set are configured to indicate respective data rates, and wherein each candidate sync portion comprises a respective plurality of on-off keying-modulated (OOK-modulated) sync symbols;
   generate a first portion of the wakeup packet, wherein the first portion of the wakeup packet corresponds to a wireless local area network (WLAN) legacy preamble of the wakeup packet, and wherein the first portion spans a first frequency bandwidth,
   generate a second portion of the wakeup packet, wherein the second portion of the wakeup packet spans a second bandwidth that is less than the first bandwidth, and wherein:
      generating the second portion of the wakeup packet includes i) generating the selected sync portion to indicate to a second communication device the determined data rate of the wakeup packet body, and ii) generating the wakeup packet body according to the determined data rate, wherein generating the selected sync portion includes selecting each sync symbol in the selected sync portion from a set including a) a non-zero energy sequence and b) a zero energy sequence to enable the second communication device to:
         detect the sync portion based on i) one or more respective autocorrelations, generated at the second communication device, between expected adjacent sync symbols corresponding to the non-zero energy sequence and ii) one or more energy levels, measured at the second communication device, of expected sync symbols corresponding to the zero energy sequence, and determine a symbol timing using the one or more respective autocorrelations;

wherein the one or more IC devices are further configured to transmit the wakeup packet.

4. The apparatus of claim 3, wherein the one or more IC devices are further configured to:

select each sync symbol in the selected sync portion from the set further including the non-zero energy sequence phase rotated by 180 degrees.

5. A method, performed by a wakeup radio (WUR) of a communication device, for processing a wakeup packet, wherein the wakeup packet includes i) a first portion having a wireless local area network (WLAN) legacy preamble that spans a first frequency bandwidth, and ii) a second portion that follows in time the first portion and that spans a second bandwidth narrower than the first bandwidth, and wherein the second portion includes i) a sync portion having a plurality of sync symbols, and ii) a wakeup packet body, the method comprising:

calculating, at the WUR, one or more correlations corresponding to one or more sync symbols included in the sync portion, wherein the sync portion is modulated according to on-off keying (OOK), wherein each sync symbol is selected from a set consisting of a) a non-zero energy sequence, and b) a zero energy sequence, and wherein calculating the one or more correlations comprises:

generating, at the WUR, one or more respective autocorrelations between expected adjacent sync symbols corresponding to the non-zero energy sequence, and measuring, at the WUR, one or more energy levels of expected sync symbols corresponding to the zero energy sequence;

detecting, at the WUR, the sync portion of the wakeup packet using the one or more respective generated autocorrelations and the one or more measured energy levels;

determining, at the WUR, that the detected sync portion corresponds to a matching sync portion from a set of candidate sync portions that respectively correspond to different data rates of the wakeup packet body;

determining, at the WUR, a data rate according to which the wakeup packet body was transmitted based on the determined matching sync portion;

determining, at the WUR, a symbol timing using the one or more respective generated autocorrelations; and processing, at the WUR, the wakeup packet body based on the determined symbol timing and in accordance with the determined data rate.

6. The method of claim 5, wherein:
determining the symbol timing further comprises using the one or more measured energy levels.

7. The method of claim 5, wherein:
each sync symbol is selected from set further including the non-zero energy sequence phase rotated by 180 degrees.

8. The method of claim 7, wherein:
determining the symbol timing further comprises using the one or more measured energy levels.

9. An apparatus, comprising:
a wakeup radio WUR associated with a wireless local area network (WLAN) network interface device, wherein the WUR comprises one or more integrated circuit (IC) devices configured to:

process a wakeup packet, wherein the wakeup packet includes i) a first portion having a WLAN legacy preamble that spans a first frequency bandwidth, and ii) a second portion that follows in time the first portion and that spans a second bandwidth narrower than the first bandwidth, and wherein the second portion includes i) a sync portion having a plurality of sync symbols and being modulated according to on-off keying (OOK), and ii) a wakeup packet body, wherein processing the wakeup packet includes:

calculating one or more correlations corresponding to one or more sync symbols included in the sync portion, wherein each sync symbol is selected from a set consisting of i) a non-zero energy sequence, and ii) a zero energy sequence, and wherein calculating the one or more correlations comprises:

generating, at the WUR, one or more respective autocorrelations between expected adjacent sync symbols corresponding to the non-zero energy sequence, and measuring, at the WUR, one or more energy levels of expected sync symbols corresponding to the zero energy sequence, detecting the sync portion of the wakeup packet using the one or more respective generated autocorrelations and the one or more measured energy levels, determining that the detected sync portion corresponds to a matching sync portion from a set of candidate sync portions that respectively correspond to different data rates of the wakeup packet body, determining a data rate according to which the wakeup packet body was transmitted based on the determined matching sync portion, determining a symbol timing using the one or more respective generated autocorrelations, and processing the wakeup packet body based on the determined symbol timing and in accordance with the determined data rate.

10. The apparatus of claim 9, wherein the one or more IC devices are configured to:
determine the symbol timing using the one or more measured energy levels.

11. The apparatus of claim 9, wherein:
each sync symbol is selected from the set further including the non-zero energy sequence phase rotated by 180 degrees.

12. The apparatus of claim 11, wherein the one or more IC devices are configured to:
determine the symbol timing using the one or more measured energy levels.

* * * * *